US011294197B1

(12) United States Patent
Mark

(10) Patent No.: US 11,294,197 B1
(45) Date of Patent: Apr. 5, 2022

(54) INTEGRAL IMAGING SYSTEM WITH CURVED ARRAY OF MICROLENSES

(71) Applicant: Lauer Mark, Pleasanton, CA (US)

(72) Inventor: Lauer Mark, Pleasanton, CA (US)

( * ) Notice: Subject to any disclaimer, the term of this patent is extended or adjusted under 35 U.S.C. 154(b) by 61 days.

(21) Appl. No.: 16/825,524

(22) Filed: Mar. 20, 2020

Related U.S. Application Data

(63) Continuation of application No. 15/463,365, filed on Mar. 20, 2017, now Pat. No. 10,606,092.

(60) Provisional application No. 62/323,524, filed on Apr. 15, 2016, provisional application No. 62/311,349, filed on Mar. 21, 2016.

(51) Int. Cl.
*G02B 30/27* (2020.01)
(52) U.S. Cl.
CPC ................... *G02B 30/27* (2020.01)
(58) Field of Classification Search
CPC ........ G02B 5/201; G02B 6/4244; G02B 7/00; G02B 27/2214; G02B 3/005; G02B 6/003; G02B 30/27
USPC .......................................... 359/462, 463, 477
See application file for complete search history.

(56) References Cited

U.S. PATENT DOCUMENTS

| 1,957,745 A | * | 5/1934 | Wildhaber | ............. G03B 35/24 352/43 |
| 5,822,125 A | * | 10/1998 | Meyers | ................ G02B 3/0056 359/621 |
| 2017/0038589 A1 | * | 2/2017 | Jepsen | ................ G09G 3/3426 |

* cited by examiner

*Primary Examiner* — Jade R Chwasz
(74) *Attorney, Agent, or Firm* — Mark Lauer; Silicon Edge Law Group LLP

(57) ABSTRACT

An imaging device having a curved array of microlenses is disclosed, the array of microlenses disposed adjacent to a curved image screen such that each of the microlenses is approximately the same distance from the image screen, the image screen including an array of spots disposed adjacent to the array of microlenses, with an opaque wall disposed between the array of microlenses and the array of spots, the wall holding the array of microlenses in a curve that approximately matches a curve of the image screen, such that the light passing through one of the microlenses corresponds to a subset of the spots disposed adjacent to that microlens.

18 Claims, 15 Drawing Sheets

INTEGRAL IMAGING SYSTEM WITH CURVED ARRAY OF MICROLENSES

CROSS-REFERENCE TO RELATED APPLICATIONS

The present application claims the benefit under 35 U.S.C. 119(e) of Provisional Application No. 62/311,349, filed Mar. 21, 2016, entitled "Integral Imaging System with Array of Horizontally Elongate Rectangular Microlenses." The present application also claims the benefit under 35 U.S.C. 119(e) of Provisional Application No. 62/323,524, filed Apr. 15, 2016, entitled "Integral Imaging System Improvements," and is a continuation of U.S. application Ser. No. 15/463,365, filed Mar. 20, 2017, entitled "Integral Imaging System with Array of Horizontally Elongate Rectangular Microlenses," which are incorporated by reference herein.

BACKGROUND

The present application relates to three-dimensional (3D) imaging systems that utilize a microlens array.

In 1908, Nobel Prize winning physicist Gabriel Lippmann proposed a technique that he called integral photography (IP), which can form 3D images using a two dimensional (2D) display, allowing the images to be observed with parallax and quasi-continuous viewing angles without needing any special viewing devices such as glasses to perceive 3D images. Integral photography uses a plane array of closely spaced small lenses to photograph a scene, recording images of the scene as it appears from many slightly different horizontal and vertical locations. When the resulting images are rectified and viewed through a similar array of lenses, a single integrated image, composed of small portions of all the images, may be seen by each eye. The position of the eye determines which parts of the small images it sees. Ideally, the visual geometry of the original scene may be reconstructed, so that the limits of the array seem to be the edges of a window through which the scene appears life-size and in three dimensions, realistically exhibiting parallax and perspective shift with any change in the position of the observer. While professor Lippmann's system used an array of tiny glass spheres, hemispherical lenses have also been used for IP.

The array of small lenses is sometimes called a microlens array (MLA). Another colloquial term is a fly's eye lens, so called because the insects have eyes with an array of small lenses. Individual lenses in the array are sometimes called lenslets. Each individual microlens in an array has the same size when used for IP, although there are other applications for which microlens sizes may vary. Microlens arrays having lenslets with circular, octagonal and square sides are known. Because the focusing portion of the lenslets have a circular outline, the octagonal sided array packs the most lenses in a given area and so is preferred over the square shape, which packs the least lenses in a given area. Typically, such microlenses have a spherical or semispherical curved focusing surface, although lenses with aspherical (e.g., parabolic) surfaces that are better at focusing light are known. Also, because human eyes are separated in a lateral direction, arrays of semi-cylindrical microlenses have been employed, which are easier to manufacture but offer 3D effects only in the lateral direction.

For the last several decades, research in this area has concentrated on the use of microlens arrays in combination with optoelectronic sensors and display devices. A recording device using a microlens array in combination with optoelectronic sensors is sometimes called a light field camera. The term integral imaging is often used for those systems that attempt to produce 3D images with these devices. Despite numerous advances, however, realistic 3D images have yet to be produced by integral imaging using these optoelectronic devices.

DETAILED DESCRIPTION

Figure 1A:
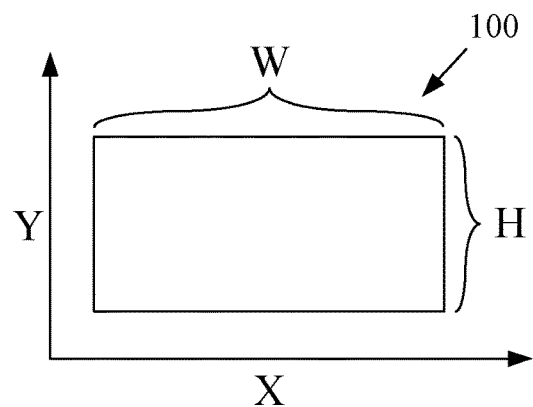
FIG. 1A is a front view of an exemplary embodiment of an imaging system.

FIG. 1A shows a front view of an exemplary embodiment of an imaging system 100. The imaging system 100, which may be either an image recording system such as a light field camera or an image display system such as a 3D television monitor, has a width W measured in an X direction and a height H measured in the Y direction. The X direction may also be called the lateral or horizontal direction, and the Y direction may also be called the vertical direction. The width-to-height aspect ratio shown is 2/1, although various other ratios are possible, such as 16/10, 16/9, 3/1 or 4/1. In general, it is preferred that system 100 has a width W that is at least 50% greater than its height H, due to a number of advantages discussed below.

Figure 1B:
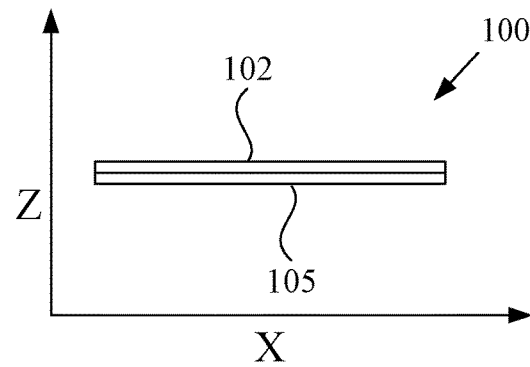
FIG. 1B is a top view of the system of FIG. 1A, including a microlens array disposed adjacent to an image screen.

FIG. 1B shows a top view of the system 100. The system 100 has a microlens array 102 disposed adjacent to an image screen 105. The image screen 105 in this simplified diagram may represent an image recording screen, comprised for example of an unexposed photographic film or optoelectronic sensors, or as an image display screen, comprised for example of a developed photographic film or flat panel electronic display. A complete imaging system 100 for recording an image and then displaying the image that was recorded requires both an image recording system and an image display system, although there are imaging systems that only require a display system 100, such as for computer generated images, and imaging systems that only require a recording system 100, such as a light camera. For recording, light travels through the microlens array 102 to be captured on recording screen 105, whereas for display, light is transmitted from the display screen 105 generally in a positive Z direction through the microlens array 102, emerging at an angles that provide the 3D information that may have been recorded, as discussed further below. In one embodiment, the imaging system 100 may have a concave curvature in the lateral direction as seen by a viewer of a display screen, and a light field camera that records images for display on such a display screen may have a similar curvature.

Figure 2:
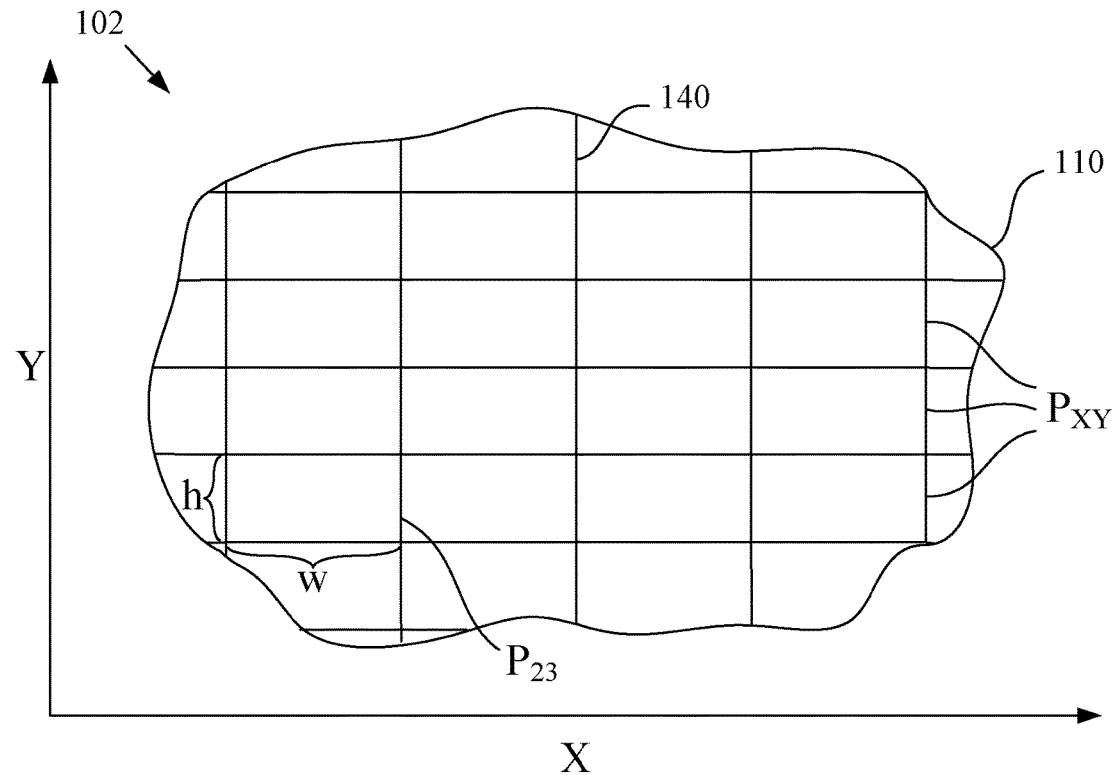
FIG. 2 is a front view of an enlarged portion of the microlens array.

FIG. 2 shows a front view of a greatly enlarged portion 110 of the microlens array 102, containing a number of individual microlenses $P_{XY}$. The microlenses $P_{XY}$ are transparent and have rectangular sides, with the microlenses $P_{XY}$ being separated from each other by an opaque wall 140. Each of the microlenses $P_{XY}$ has a width w measured in the X direction is substantially greater than a height h measured in the Y direction, as shown for example by microlens $P_{23}$. The width-to-height aspect ratio of each microlens shown is 2/1, although various other ratios are possible, such as 16/10, 16/9, 3/1 or 4/1. For rectangular microlenses it is preferred that each microlens have a width w that is at least 50% greater than its height h, for recording and displaying 3D information in a manner corresponding to the lateral displacement of human eyes. For most rectangular microlens embodiments, however, it is preferred to have an aspect ratio that is not greater than 4/1, to provide adequate resolution in the vertical or Y direction.

For a display system, the microlenses $P_{XY}$ ideally border on being microscopic, in that each of the microlenses $P_{XY}$ is designed to be too small to be individually discerned by human eyes, so that each appears as a dimensionless point on a display screen. The angular resolution of a naked human eye is about 1 arcminute, approximately 0.02° or 0.0003 radians, which corresponds to 0.3 millimeters at a distance of 1 meter, or about 150 microns at a distance of 50 centimeters. Thus, the width w of each microlens ideally is less than 300 microns for a display screen that is to be viewed at a distance of 1 m, and ideally less than 150 microns for a display screen that is to be viewed at a distance of 50 cm, although dimensions of about twice the ideal dimensions would still offer a very sharp image. Note that most conventional 2D display screens do not have resolution that is high enough so that individual pixels are not discernable, so a more relaxed standard for a 3D display may be acceptable, such as microlenses with a lateral dimension of up to 1 millimeter. For a microlens array 102 that is about 1 meter in width by 0.5 meter in height, and for which each of the microlenses $P_{XY}$ is 250 microns wide by 125 microns in height, the total number of microlenses $P_{XY}$ in the array 102 is 16,000,000. For the same size display with microlenses that are 1 mm wide by 0.5 mm high, the total number of microlenses $P_{XY}$ in the array 102 is 1,000,000.

For a display that is to be worn on a person's head and has a closer viewing distance of, for example, 10 centimeters, each microlens ideally is less than 30 microns, but should offer a sharp image when the microlenses each have a width of less than 60 microns. However, because a display that is to be worn on a person's head is held at a fixed distance from the person's eyes, the microlenses may be designed to focus near the eyes rather than transmitting collimated beams approximately the size of the microlenses, reducing the apparent size of the microlenses to the eye, and therefore allowing the microlenses to be larger.

Figure 3A:
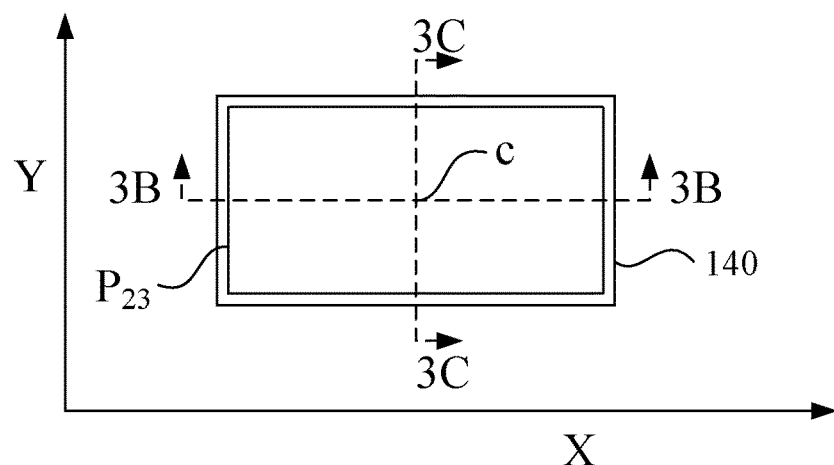
FIG. 3A is a front view of one of the microlenses of FIG. 2.
Figure 3B:
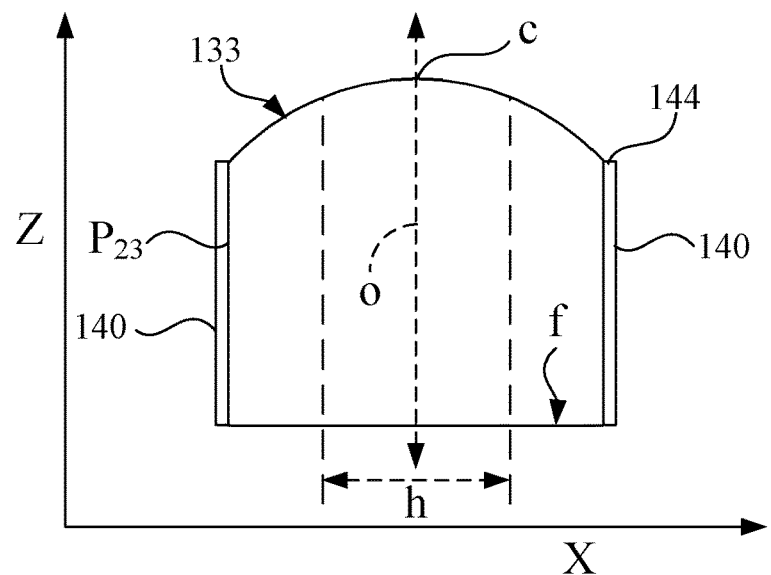
FIG. 3B is a cross-sectional view of the microlens of FIG. 3A that extends in the X-Z plane.
Figure 3C:
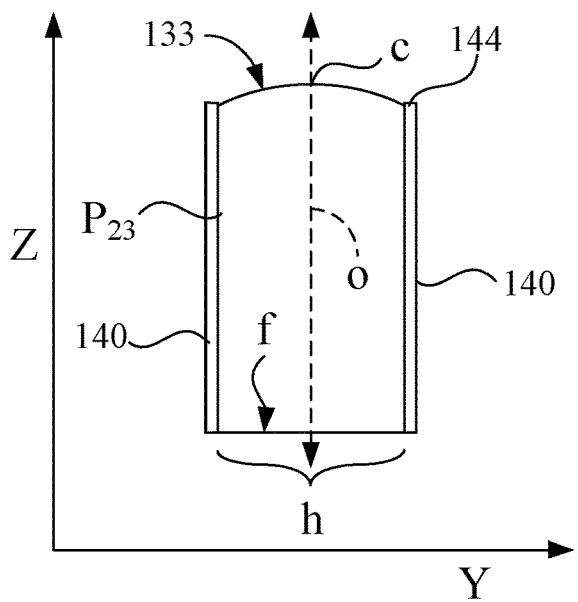
FIG. 3C is a cross-sectional view of the microlens of FIG. 3A and FIG. 3B that extends in the Y-Z plane.

FIG. 3A, FIG. 3B and FIG. 3C are different views of an embodiment of an individual microlens (e.g., microlens $P_{23}$) of the microlens array 102. FIG. 3A is a front view from the perspective shown in FIG. 2 but further enlarged, FIG. 3B is a cross-sectional view that extends in the X-Z plane and FIG. 3C is a cross-sectional view that extends in the Y-Z plane. The microlens $P_{23}$ is made of a transparent material with an index of refraction of at least 1.2, preferably at least about 1.4, and most preferably at least about 1.6 (unless otherwise indicated, the refractive indexes described herein are for green light). As shown in FIG. 3B, a surface 133 of the microlens $P_{23}$ is curved along the X direction symmetrically about the center c, for focusing light that passes through the microlens $P_{23}$. As shown in FIG. 3C, the surface 133 is also curved along the Y direction symmetrically about the center c, for focusing light that passes through the microlens $P_{23}$. The lens may be aspherical, for example with the curvature of the surface 133 parabolic or elliptical, as is known in the art of lens design.

In one embodiment, microlens $P_{23}$ has an optical axis o that passes through center c as a line that is disposed midway between the horizontal and vertical sides of the microlens $P_{23}$, i.e., at the center of the rectangular perimeter formed by the wall 140. In one embodiment, microlens $P_{23}$ has a focal plane f that is located at or slightly above or beneath the planar bottom surface of the microlens $P_{23}$. For light that is transmitted by the microlens, the focal plane is the plane at which light transmitted from various X and Y coordinates is collimated by the microlens. For light that is received by the microlens, the focal plane is the plane at which collimated light from various angles to the optical axis is focused at different X and Y coordinates by the microlens. Because real lenses do not have perfect focal planes, the focal plane can be thought of as the plane that is perpendicular to the optical axis and includes the focal point. In one embodiment, the focal plane f has a width-to-height aspect ratio approximately equal to that of the microlens $P_{23}$, with the focal plane having a width that is at least fifty percent greater than its height, although the focal plane f may be located outside of microlens $P_{23}$ and at the surface of or within a corresponding image screen, not shown in this figure. In one embodiment, the curvature of the surface 133 along the X direction is equal to the curvature of that surface along the Y direction, for the same distance from the center c. For instance, the curvature of the surface 133 for the distance h is the same for the cross section shown in FIG. 3B as for the cross section shown in 3C.

In one embodiment, the microlens $P_{23}$ has a depth, measured in the Z direction, that is similar to its focal length, so that the microlens focuses light on an image screen for recording or collimates light from an image screen for display. In an alternative embodiment that does not rely solely on surface curvature for focusing light, the index of refraction can vary, being lowest near a center c and highest near the corners of the microlens $P_{23}$, the refractive index gradient being achieved by doping, for example. Another alternative embodiment can include a diffraction grating, such as concentric steps, on the surface 133. A transparent material having an index of refraction that is less than that of the microlens $P_{23}$ may be disposed atop surface 133 and coat the microlens array 102, that material having a flat surface which reduces chromatic aberration and protects the array 102.

Figure 14:
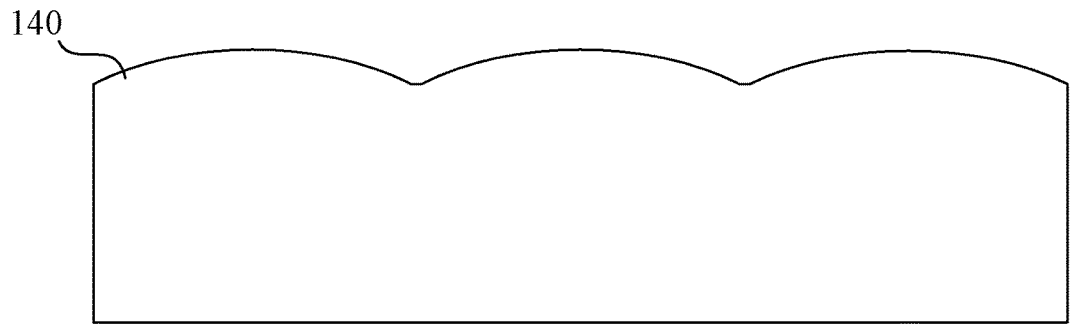
FIG. 14 is a cross-sectional view of a portion of the wall that adjoins the elongate sides of microlenses shown in FIG. 13.

In one embodiment, the wall 140 may be made of an opaque material that has minimal reflectivity, such as for example a metal that has a black oxide surface. The wall 140 may have a reflectivity of less than 20% at an angle of incidence of 45 degrees, which is termed low reflectivity, and preferably reflects less than 12% of such incident light. The wall 140 may have a thickness in a range between a few microns and about 20 microns, for instance, and is preferably 10 microns or less. The thickness of the wall 140 may be small compared to the lateral and vertical dimensions of the microlens $P_{23}$, for example less than 10% of the width w, or less than 5% of the height h. The wall 140 has a depth that is similar to the focal length of the microlens 140. In one embodiment, the wall 140 has a top 144 that is arched with a curve that is similar to or matches that of the edge of the microlens $P_{23}$ that borders the wall, as shown in FIG. 14. While a single wall is shown, a plurality of walls can be disposed between the microlenses.

Figure 4:
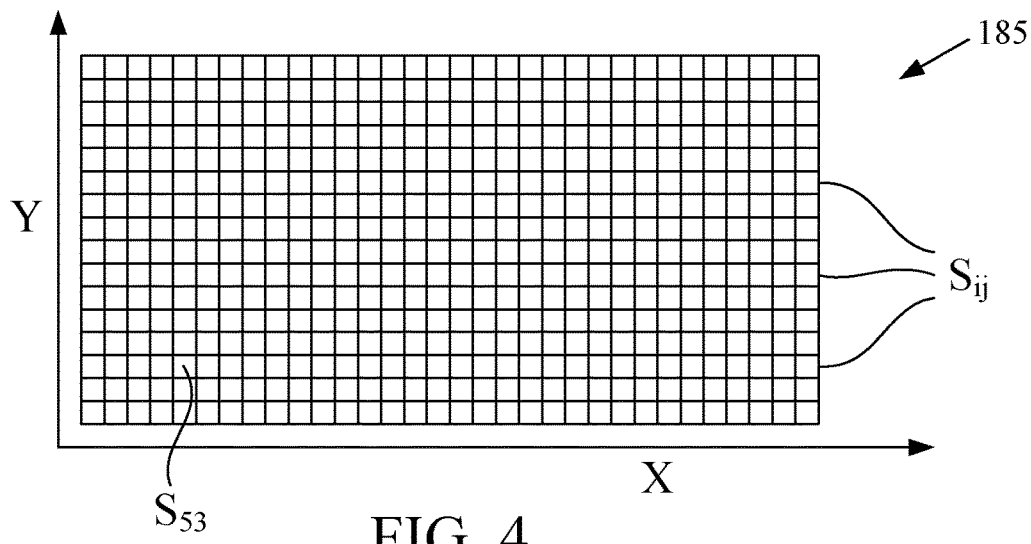
FIG. 4 is a front view of a greatly magnified portion of the image screen of FIG. 1B that is located directly beneath the microlens of FIG. 3A, FIG. 3B and FIG. 3C.

FIG. 4 is a top view of a greatly magnified portion 185 of the image screen 105 that is located directly beneath the microlens $P_{23}$, which is not shown in this figure. The image screen portion 185 includes an array of spots $S_{ij}$ that correspond to the microlens $P_{23}$, the spots arranged in the X and Y directions. For a display system embodiment, the spots $S_{XY}$ transmit light through microlens $P_{23}$. For a recording system embodiment, the spots $S_{ij}$ instead receive light that has been focused through the microlens. As discussed below, the spots of the display system embodiments are physically different from the spots of the recording system embodiments, but are both simply termed spots for convenience in this description. The spots $S_{ij}$ may each receive or transmit light of various colors or the spots may be configured in groups of three, for example, with each spot in the group of three receiving or transmitting one of the primary colors of red, green and blue. Image screens for display system embodiments include, but are not limited to, photographic films or optoelectronic displays such as liquid crystal display (LCD) screens, light emitting diode (LED) display screens, organic light emitting diode (OLED) display screens or quantum dot display screens. Image screens for recording system embodiments include, but are not limited to, photographic films or optoelectronic sensor arrays such as photodiode arrays, complimentary metal-oxide (CMOS) sensors or charge coupled device (CCD) sensors. As discussed below, the location of a particular spot, e.g., spot $S_{53}$, relative to the center of its corresponding microlens, e.g., microlens $P_{23}$, determines the angle at which the light passing through that microlens is recorded or displayed.

Figure 5A:
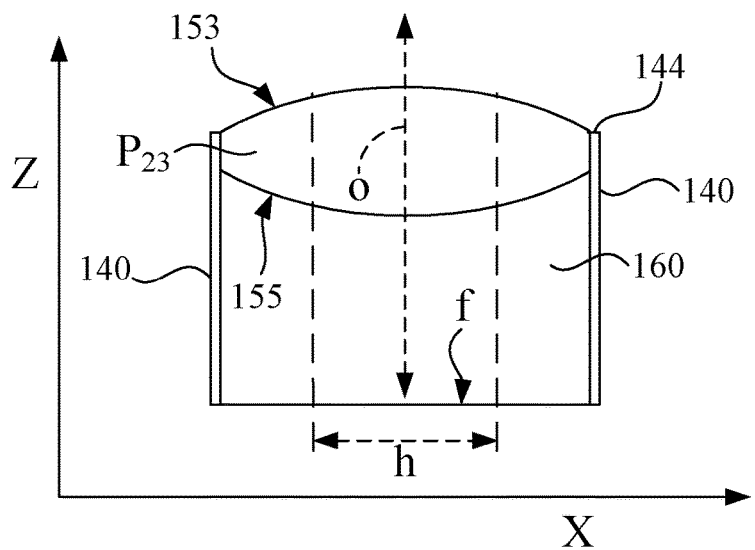
FIG. 5A is a cross-sectional view that extends in the X-Z plane of a bi-convex embodiment one of the microlenses of FIG. 2.
Figure 5B:
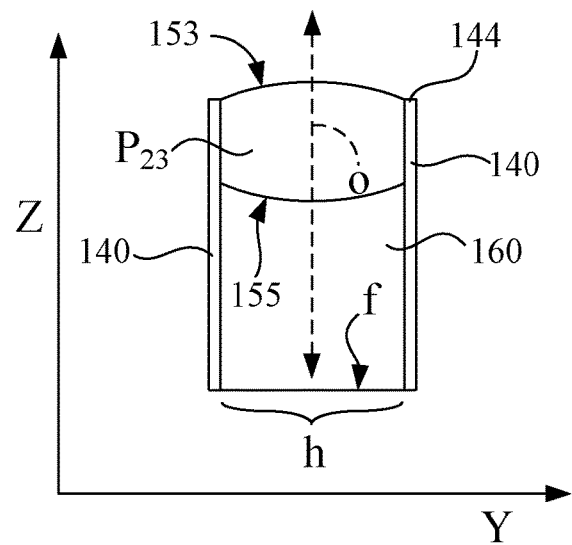
FIG. 5B is a cross-sectional view of the microlens of FIG. 5A that extends in the Y-Z plane.

FIG. 5A and FIG. 5B are different views of another embodiment of an individual microlens (e.g., microlens $P_{23}$) of the microlens array 102. The microlens shown in FIG. 5A and FIG. 5B may be termed bi-convex, as opposed to the embodiment of FIG. 3A, FIG. 3B and FIG. 3C, which may be termed planar-convex. FIG. 5A is a cross-sectional view that extends in the X-Z plane and FIG. 5B is a cross-sectional view that extends in the Y-Z plane.

The microlens $P_{23}$ is made of a transparent material with an index of refraction of at least 1.3, and preferably at least 1.5 and most preferably at least 1.6. In one embodiment shown in FIG. 5A, the microlens $P_{23}$ has two surfaces 153 and 155 which are each curved along the X direction symmetrically about an optical axis o, for focusing light that passes through the microlens $P_{23}$. As shown in FIG. 5B, the surfaces 153 and 155 are also curved along the Y direction symmetrically about the optical axis o, for focusing light that passes through the microlens $P_{23}$. In one embodiment, the optical axis o is disposed midway between the horizontal and vertical sides of the microlens $P_{23}$, i.e., at the center of the rectangular perimeter formed by the wall 140. In one embodiment, microlens $P_{23}$ has a focal plane f that is located at or slightly or below the planar bottom surface of the microlens $P_{23}$, and so the focal plane is limited in area by the wall 140. In one embodiment, the focal plane f has a width-to-height aspect ratio approximately equal to that of the microlens $P_{23}$, with the focal plane having a width that is at least fifty percent greater than its height, although the focal plane f may be located outside of microlens $P_{23}$ and at the surface of or within a corresponding image screen, not shown in this figure.

In one embodiment, the curvature of the surface 153 along the X direction is equal to the curvature of that surface along the Y direction, for the same distance from the optical axis o. For instance, the curvature of the surface 153 for the distance h is the same for the cross section shown in FIG. 5A as for the cross section shown in 5B. Similarly, the curvature of the surface 155 along the X direction may be equal to the curvature of that surface along the Y direction, for the same distance from the optical axis o. For instance, the curvature of the surface 155 for the distance h is the same for the cross section shown in FIG. 5A as for the cross section shown in FIG. 5B.

In addition to the processing described herein, the curvatures of the front and back surfaces of can be varied according to other known processing techniques to obtain a microlens $P_{23}$ with desired features. For example, the curvature of surface 153 may be elliptical and the curvature of surface 155 may be hyperbolic, as is known in the art of lens design to provide a desired shape to focus collimated incoming light on various spots at a focal plane on a recording screen, or to collimate light that is transmitted from various spots at a focal plane on a recording screen. No real lens is perfect, however, and so microlens $P_{23}$ focuses collimated light approximately rather than perfectly on a focal plane, and collimates transmitted light approximately rather than perfectly from the focal plane.

A transparent material 160 is disposed below the microlens $P_{23}$ in the Z direction so that the material is located between the microlens and the image screen, not shown in this figure. The material 160 may be a gas, liquid or solid, and preferably has an index of refraction that is less than that of the microlens $P_{23}$. For example, the material 160 may be air or a polymer, and may have an index of refraction in a range between 1 and 1.4. In one embodiment the microlens focuses light on the image screen for recording and collimates light from the image screen for display. In one embodiment, either or both surfaces 153 and 155 can include a diffraction grating, such as concentric steps. Another transparent material having an index of refraction that is less than that of the microlens $P_{23}$ may be disposed atop surface 153 and coat the microlens array 102, that material having a flat surface which reduces chromatic aberration and protects the array 102.

Figure 6:
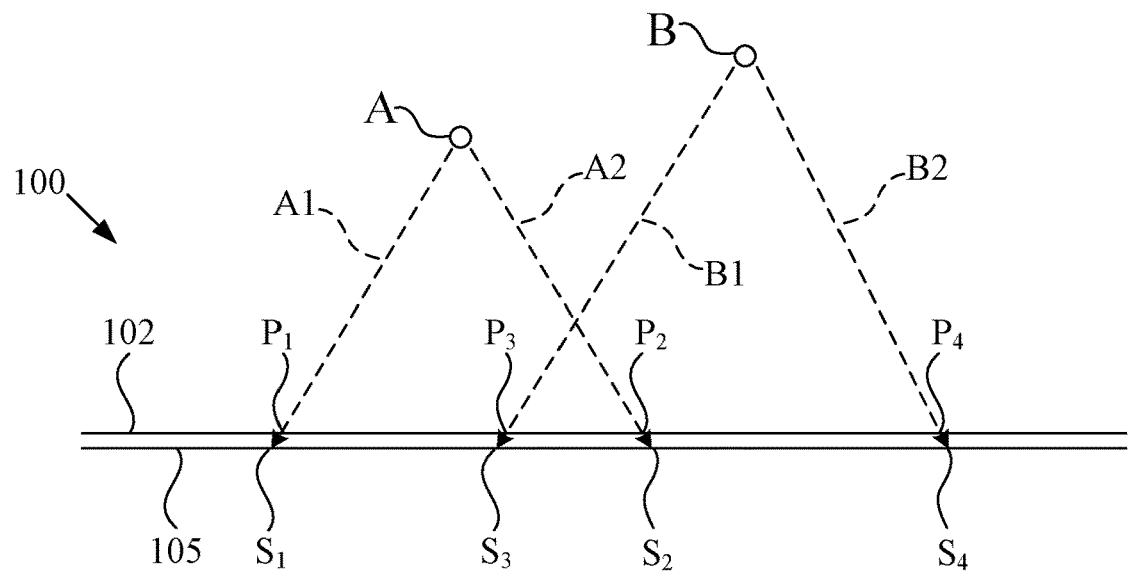
FIG. 6 is a diagram of an imaging system of viewed from the top, depicting the system recording an image with 3D information.

FIG. 6 is a diagram of imaging system 100 viewed from the top, and depicts the system recording an image with 3D information. To simplify the following explanation, microlens array 102 is depicted as a plane (which appears as a line in this top view) with the many individual microlenses not shown for clarity. Similarly, recording array 105 is depicted as a plane (which appears as a line in this top view) with the individual recording spots such as sensors being too small to be seen. For simplicity, microlens array 102 and recording screen 105 are depicted as being slightly separated in this simplified diagram, although the microlens array 102 and recording screen 105 may contact each other, with the recording screen located at or near the focal plane of the microlens array.

For recording 3D information on the 2D image plane 105, each of the microlenses of array 102 allows light to pass through at various angles, so that the light that is recorded on a particular spot of the image plane records the angle that the light passed through that microlens. For example, light from object A passes through microlens $P_1$ as shown by light ray A1, and is recorded on the portion of the image plane corresponding to $P_1$ at spot $S_1$. Light from object A also passes through microlens $P_2$ as shown by light ray A2, and is recorded on the portion of the image plane corresponding to $P_2$ at spot $S_2$. Similarly, light from object B passes through microlens $P_3$ via light ray B1 to be recorded on the portion of the image plane corresponding to $P_3$ at spot $S_3$, while light from object B also passes through microlens $P_4$ via light ray B2 to be recorded on the portion of the image plane corresponding to $P_4$ at spot $S_4$.

If the recording process were then simply reversed for display, an inverted image of objects A and B would be seen by a person viewing the image system 100 at a location further from the system 100 than where objects A and B were during recoding. That is, if light rays A1 and A2 were transmitted from the spots at which they were recorded on the image screen 105 in an opposite direction from the direction in which they were recorded, reversed-direction light rays A1 and A2 would cross at where object A was located during recording, and an (inverted) image of object A would appear to the eyes of the person viewing image system 100 from a distance further away from the system than where reversed-direction light rays A1 and A2 intersect. Similarly, if light rays B1 and B2 were transmitted from the spots at which they were recorded on the image screen 105 in an opposite direction from the direction in which they were recorded, reversed-direction light rays B1 and B2 would cross at where object B was located during recording, and an (inverted) image of object B would appear to the eyes of the person viewing image system 100 from a distance further away from the system than where reversed-direction light rays B1 and B2 intersect. Unfortunately, the relative positions of objects A and B in this 3D image would also be inverted. For example, object A would appear further away and to the right of object B, whereas object A in FIG. 6 is closer and to the left of object B when recorded.

Figure 7:
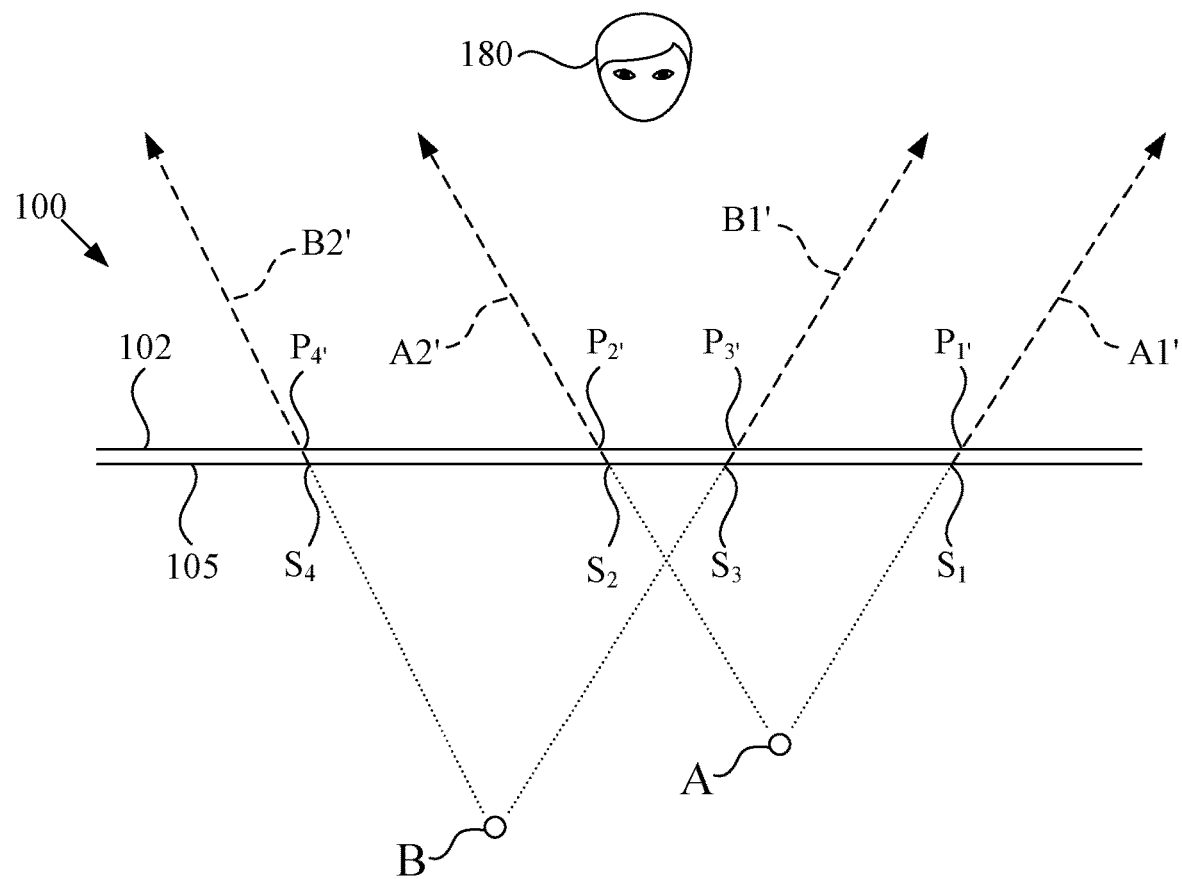
FIG. 7 is a diagram of an imaging system viewed from the top, depicting the system displaying the 3D image that was recorded in FIG. 6.

FIG. 7 is a diagram of a system like that of FIG. 6 viewed from the top, functioning as a display system 120 that displays the 3D image of objects A and B that was recorded in FIG. 6. The display system 120 includes microlens array 102 that is simplistically depicted as being slightly separated from display screen 105. In FIG. 7, the microlenses of FIG. 6 have been remapped in the X direction to an opposite relative position on the microlens array 102, which may be called a converse position, as can be seen by the positions of microlenses $P_{1'}$, $P_{2'}$, $P_{3'}$ and $P_{4'}$. However, the spots $S_{1'}$, $S_{2'}$, $S_{3'}$ and $S_{4'}$ corresponding to those microlenses $P_{1'}$, $P_{2'}$, $P_{3'}$ and $P_{4'}$ are located in the same position that they were relative to respective recording microlenses $P_1$, $P_2$, $P_3$ and $P_4$, so that spots transmit light in a direction that is reversed to that recorded.

For example, light ray A1' is transmitted from spot $S_{1'}$ in an opposite direction from that of recorded light ray A1, and from a relative position $P_{1'}$ of microlens array 102 that is opposite to the position $P_1$ at which it was recorded. Similarly, light ray A2' is transmitted from spot $S_{2'}$ in an opposite direction from that of recorded light ray A2, and from a relative position $P_{2'}$ of microlens array 102 that is opposite to the position $P_2$ at which it was recorded. A person 180 viewing the imaging system 100 would therefore perceive a virtual image of object A that appears to be located behind the imaging system.

Likewise, light ray B1' is transmitted from spot $S_{3'}$ in an opposite direction from that of recorded light ray B1, and from a relative position $P_{3'}$ of microlens array 102 that is opposite to the position $P_3$ at which it was recorded. Similarly, light ray B2' is transmitted from spot $S_{4'}$ in an opposite direction from that of recorded light ray B2, and from a relative position $P_{4'}$ of microlens array 102 that is opposite to the position $P_4$ at which it was recorded. The person 180 viewing the imaging system 100 would therefore perceive a virtual image of object B that appears to be located behind the imaging system.

In the example depicted in FIG. 7, object A appears closer and to the left of object B, forming an accurate 3D image of objects A and B as seen by person 180, the image appearing to be located behind the display.

Figure 8:
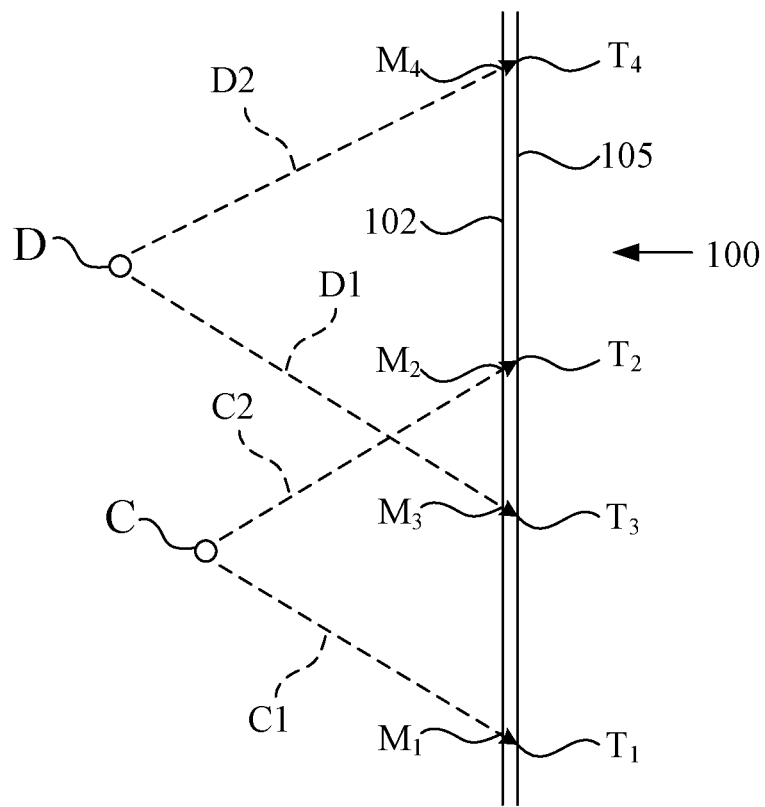
FIG. 8 is a diagram of an imaging system viewed from the side, depicting the system recording an image with 3D information.

FIG. 8 is a diagram of imaging system 100 viewed from the side, depicting the system recording an image with 3D information. For recording 3D information on the 2D image plane 105, each of the microlenses of array 102 allows light to pass through at various angles, so that the light that is recorded on a particular spot of the image plane records the angle that the light passed through that microlens. For example, light from object C passes through microlens $M_1$ as shown by light ray C1, and is recorded on the portion of the image plane corresponding to $M_1$ at spot $T_1$. Light from object C also passes through microlens $M_2$ as shown by light ray C2, and is recorded on the portion of the image plane corresponding to $M_2$ at spot $T_2$. Similarly, light from object D passes through microlens $M_3$ via light ray D1 to be recorded on the portion of the image plane corresponding to $M_3$ at spot $T_3$, while light from object D also passes through microlens $M_4$ via light ray D2 to be recorded on the portion of the image plane corresponding to $M_4$ at spot 14.

Figure 9:
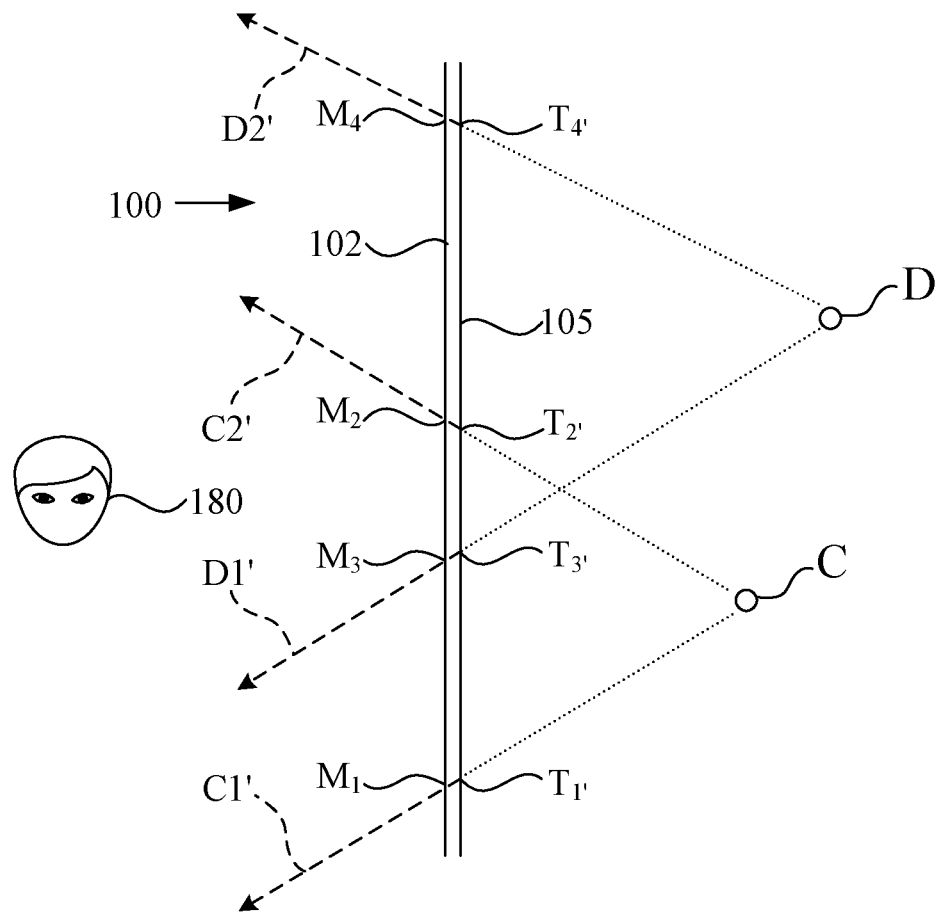
FIG. 9 is a diagram of an imaging system viewed from the side, depicting the system displaying the 3D image that was recorded in FIG. 8.

FIG. 9 is a diagram of imaging system 100 viewed from the side, depicting the system displaying the 3D image that was recorded in FIG. 8. The display system 100 includes microlens array 102 that is simplistically depicted as being slightly separated from display screen 105. In FIG. 9, the microlenses of FIG. 8 are located in the same position in the Y direction that they were on the microlens array 102, as can be seen by the positions of microlenses M1', $M_2$', $M_3$' and $M_4$'. However, the spots $T_1$', $T_2$', $T_3$' and $T_4$' have been remapped in the Y direction to an opposite position relative to their corresponding microlenses $M_1$', $M_2$', $M_3$' and $M_4$', so that spots transmit light in a direction that is complementary to that recorded, at an opposite angle to horizontal.

For example, light ray C1' is transmitted from spot $T_1$' in a complementary direction from that of recorded light ray C1, and from a relative position $M_1$' of microlens array 102 that the same as the microlens position $M_1$ at which it was recorded. Similarly, light ray C2' is transmitted from spot $T_2$' in a complementary direction from that of recorded light ray C2, and from a relative position $M_2$' of microlens array 102 that the same as the microlens position $M_2$ at which it was recorded. A person 180 viewing the imaging system 100 would therefore perceive a virtual image of object C that appears to be located behind the imaging system.

Likewise, light ray D1' is transmitted from spot $T_3$' in a complementary direction from that of recorded light ray D1, and from a relative position $M_3$' of microlens array 102 that is the same as the microlens position $M_3$ at which it was recorded. Similarly, light ray D2' is transmitted from spot $T_4$' in a complementary direction to that of recorded light ray D2, and from a relative position $M_4$' of microlens array 102 that is the same as the microlens position $M_4$ at which it was recorded. The person 180 viewing the imaging system 100 would therefore perceive a virtual image of object D that appears to be located behind the imaging system.

In the example depicted in FIG. 9, object C appears closer and below object D, forming an accurate 3D image of objects C and D as seen by person 180, the image appearing to be located behind the display.

Figure 10:
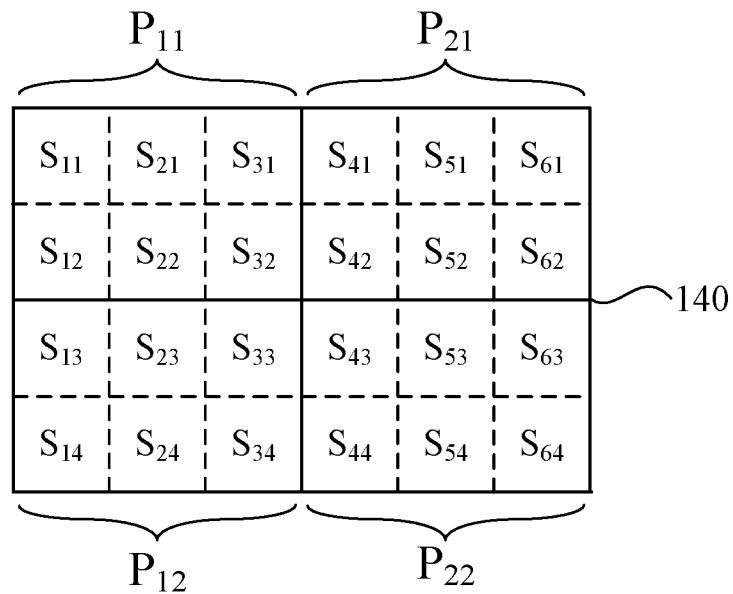
FIG. 10 is a diagram of a front view of a recording system including microlenses and recording spots.
Figure 11:
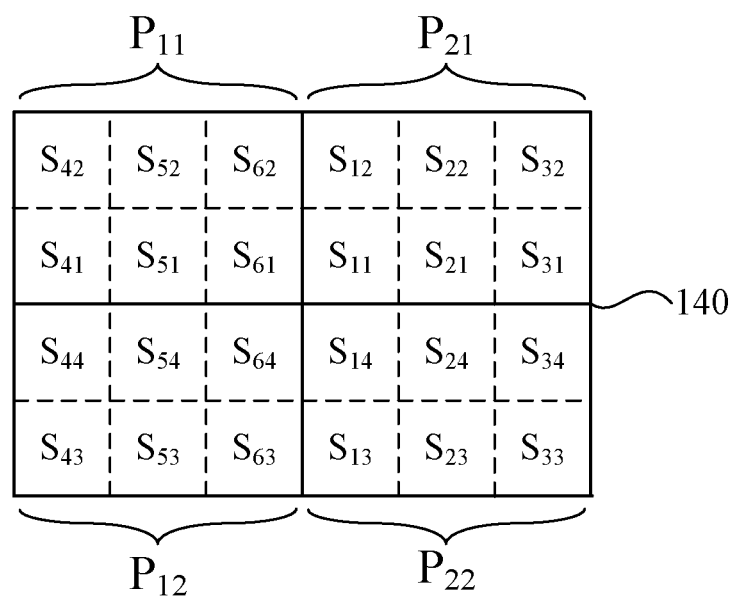
FIG. 11 is a diagram of a front view of a display system with microlenses and display spots that are mapped to display images captured by the recording system of FIG. 10.

FIGS. 10 and 11 are diagrams that illustrate the mapping described above. FIG. 10 depicts a front view of a simple recording system including four microlenses, microlenses $P_{11}$, $P_{21}$, $P_{12}$ and $P_{22}$, each of which has six corresponding recording spots, with a wall 140 separating the recoding spots from other microlenses. Recording spots $S_{11}$, $S_{21}$, $S_{31}$, Sit $S_{22}$ and $S_{32}$ correspond to microlens $P_{11}$, recording spots $S_{41}$, $S_{51}$, $S_{61}$, $S_{42}$ $S_{52}$ and $S_{62}$ correspond to microlens $P_{21}$, recording spots $S_{13}$, $S_{23}$, $S_{33}$, $S_{14}$ $S_{24}$ and $S_{34}$ correspond to microlens $P_{12}$, and recording spots $S_{43}$, $S_{53}$, $S_{63}$, $S_{44}$ $S_{54}$ and $S_{64}$ correspond to microlens $P_{21}$. FIG. 11 depicts a front view of a simple display system including the same or similar microlenses $P_{11}$, $P_{21}$, $P_{12}$ and $P_{22}$. FIG. 11 shows the locations on the display system to which the recording spots $S_{11}$-$S_{64}$ are mapped to display an image that was recorded in FIG. 10. In the X direction, the microlens to which a recording spot corresponds is mapped to a converse microlens for display, while the position of the recording spot within the microlens is unchanged for display. In the Y direction, the microlens to which a recording spot corresponds is unchanged for display, while the position of the recording spot within the microlens is mapped to a converse position for display.

For simplicity, a spot or microlens in a first array that is numbered in a positive X direction beginning at the left side of the array is said to be in a converse X position to a spot in a second array having the same number counted in the negative X direction beginning at the right side of the array, and vice-versa. Similarly, a spot or microlens in the first array that is numbered in a positive Y direction beginning at the bottom of the array is said to be in a converse Y position to a spot in a second array having the same number counted in the negative Y direction beginning at the top of the array, and vice-versa.

Thus, the groups of spots corresponding to the microlenses can be remapped with simple matrix algebra, resulting in an identified one-to-one correlation between each spot on a recording screen and each spot on a display screen. This mapping scheme can be generalized to systems that have different numbers of microlenses for recording and display by proportioning the recording and display microlenses, and can similarly be generalized to systems that have different numbers of spots for recording and display by proportioning the recording and display spots.

As noted above with regard to FIG. 2, the total number of microlenses $P_{XY}$ in one embodiment of array 102 may be 16,000,000. As shown in FIG. 4, in one embodiment the total number of spots $S_{ij}$ corresponding to each of those microlenses may be $2^4 \times 2^5 = 2^9$, or 512. Thus, the total number of spots in such an imaging system may exceed 8,000,000,000. The mapping scheme described and depicted in FIGS. 6-11 can be useful in processing images for such very large numbers of spots. For example, an imaging system such as that shown in FIG. 2, which records images as spots corresponding to microlenses numbered in positive X and Y directions from a lower left corner of a recording screen, can be remapped for display by renumbering the microlenses and spots corresponding to each microlens as shown above.

In an embodiment that may be used in an augmented reality display in which the image seen by a person has been reflected off of a glass or other surface that the person is also looking through, mapping from a recorded image to a displayed image is somewhat different. In this case, the display microlenses are mapped to the same position on the microlens array, and the spots corresponding to each microlens are renumbered in both the negative X direction and negative Y direction. That is, the spots corresponding to each microlens are remapped to a converse X and Y position for that microlens. Such a renumbering has the effect of transmitting light from each microlens at an opposite angle relative to the Y-Z plane from the angle at which it was recorded, which after reflection from the glass can result in display of the image that was recorded.

A display system such as that shown in FIGS. 7 and 9 may reduce the discomfort that can be experienced with some other 3D imaging systems. For example, an effect termed convergence-accommodation conflict is known to cause stress and fatigue with some 3D systems. The effect is caused by the natural reflex of human visual systems to focus at a distance that is appropriate for the convergence of the eyes (the angle that the eyes are turned toward each other rather than straight ahead), and to converge at an angle that is appropriate for the focus of the eyes. The system shown in FIGS. 7 and 9 displays images behind the screen, which causes the eyes to attempt to focus at distance, while the light rays transmitted from the system are collimated, which are well perceived by distance focused eyes. The improvement can be even greater for situations in which a display is located close to the eyes, such as for a virtual reality headset. In this case, conventional 3D systems may require a very large convergence and very close focus, causing strains additional to the convergence-accommodation conflict, and are known to have caused nausea for viewing periods longer than several minutes. The more relaxed convergence and focus that may be used to view the display system shown in FIG. 7 may reduce or eliminate such nausea. Moreover, because the distance between the eyes and the display is fixed for a display that is worn on the head, the microlenses can be made to focus the transmitted light at or slightly in front of the eyes, sharpening the image and further reducing the convergence-accommodation conflict.

The imaging system 100 utilizing elongate rectangular microlenses has a number of advantages. For example, unlike typical microlenses that have a circular perimeter, the rectangular-sided microlenses $P_{xy}$ of array 102 provide more lensing area per total surface area, providing an increased number of pixels and/or subpixels for a given imaging system area and consequent improvement in resolution. Stated differently, the microlens array 102 packs more lenses in a given space and has less wasted space than is conventional.

The increased width-to-height aspect ratio of the microlenses in array 102 provides increased viewing angle in the lateral direction at a cost of decreased viewing angle in the vertical direction. Because the lateral separation of human eyes causes perception of lateral parallax to be much more important than perception of vertical parallax, this aspect ratio offers great improvement in 3D perception at little cost. Stated differently, a MLA in which each microlens has a width-to-height aspect ratio of two-to-one can have essentially double the resolution of a similar display with a one-to-one aspect ratio, in addition to the other advantages of the elongate rectangular microlenses.

The increased width-to-height aspect ratio of each microlens $P_{xy}$ facilitates creation of an overall array 102 and imaging system 100 with an increased width-to-height aspect ratio. For example, if the microlens array 102 includes the same number of microlenses $P_{xy}$ in the vertical and horizontal directions, the overall array 102 has an aspect ratio that is essential the same as that of each individual microlens $P_{xy}$. Because humans perceive a larger lateral than vertical field of view, the increased width-to-height aspect ratio of such an imaging system 100 corresponds to human perception, optimizing perception of the system. Scaling of the imaging system may be easily accomplished by simply adding more rows and columns of microlenses and corresponding image screen.

Further, much as the increased width-to-height aspect ratio of the individual microlens contributes to the lateral parallax that humans naturally perceive, the increased width-to-height aspect ratio of the overall microlens array and imaging system also increases the lateral parallax that humans perceive, at a cost of decreased vertical parallax that humans do not notice unless their eyes are at a large tilt relative to the display screen. For an embodiment in which a display is to be worn on a person's head, such as a virtual reality headset, the screen is fixed relative to the person's eyes, in a position without any tilt. Note that the increased lateral parallax is perceptible while looking up or down at a display screen, in contrast to prior art cylindrical or semi-cylindrical microlens arrays, which had surfaces with no curvature along vertical lines, and therefore did not focus light that was angled up or down, whether for display or recording. Instead, for those prior art arrays, light that was angled up or down was recorded out of focus and in error, and light that was transmitted at an angle up or down was also out of focus and in error, greatly blurring any image.

The recording or display screen portions that are covered by the wall 140 can be used for communication pathways instead of recording or display spots $S_{ij}$. This is not easily achieved for an array with hexagonal-sided microlenses, which has a geometric arrangement of microlenses that does not coincide with rectangular address layouts, such as for CMOS sensors and flat panel displays. Moreover, the communication pathways that run beneath the walls that separate the microlenses are suited to addressing the spots in groups that correspond to each microlens, which is helpful for the mapping scheme discussed above.

The opaque, low-reflectivity wall 140 that separates the microlenses reduces recording and display of erroneous image signals. Some prior art integral imaging systems do not provide any wall that separates microlenses, and can suffer from cross-talk between microlenses. That is, light that passes through a microlens without a wall may be sensed by a sensor located beneath an adjacent microlens, causing erroneous recording. Similarly, light that is transmitted by a pixel on a display screen may pass through more than one microlens without a wall, causing various image problems. Further, providing a low-reflectivity coating or otherwise ensuring that the reflections from the wall are minimized further reduces the recording and display of erroneous signals.

Moreover, because these various improvements involve both recording systems and display systems, an imaging system that employs the improvements for both recording and imaging can compound the advantages.

Figure 12:
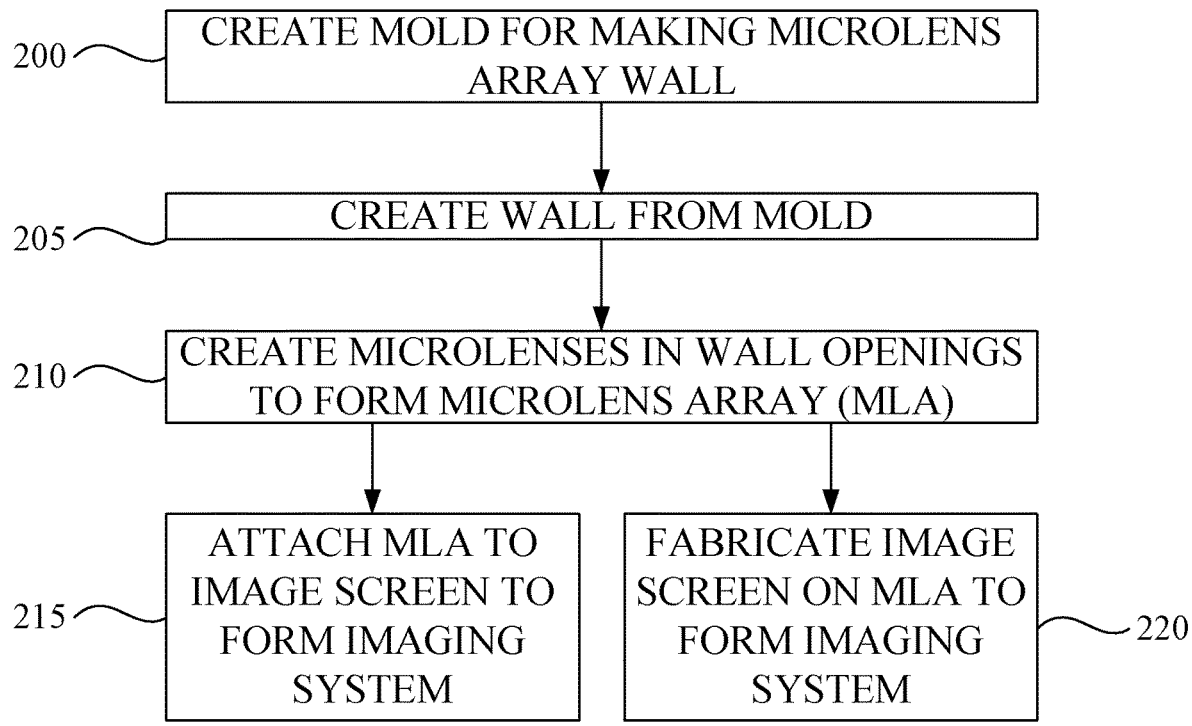
FIG. 12 is a flow chart of a method for making a microlens array.

FIG. 12 shows an exemplary embodiment of a method for making a microlens array. In a first step, a block of material with a smooth surface that has dimensions somewhat larger than the X and Y dimensions of the desired microlens array is manufactured or obtained, in order to create a mold 200 for making the wall 140. In one example, the block material may be a hard metal such as a refractory metal or alloy of a refractory metal. The smooth surface is then cut with tiny trenches to create a mold 200 for making the wall that will separate the individual microlenses of the microlens array. In one example, the cutting is performed by a water jet laser such as described in the article entitled "Water Jet Guided Laser Cutting: a Powerful Hybrid Technology for Fine Cutting and Grooving," which is incorporated by reference herein and is available at www.synova.ch/fileadmin/user_upload/conferences/ALAC04.pdf. That article states in part that "The water jet guided laser offers in this field important advantages: the edges are perfectly rectangular, without contamination or deposit and free of heat influence. The surface quality is as good as after EDM. It is possible to generate 5 micron wide and 2 mm deep trenches in hard metal that no other process in the world can produce."

In one example, the wall need not be as thin as 5 microns or as deep as 2 mm. As noted above, the depth may be similar to the focal length of the microlens array, for example in a range between 100 and 500 microns, and the thickness of the wall may be in a range between 5 microns and 30 microns. In one embodiment, the depth of the trench can vary slightly to create arches in the wall near the midpoint of each microlens, for example by varying the speed at which the trench is cut as the laser light travels in a straight line across the block of material. In one embodiment a single laser can make multiple parallel passes across the block, in another embodiment multiple lasers can cut parallel trenches simultaneously. After all the parallel trenches have been cut in one direction, a series of trenches is cut in an orthogonal direction to form the mold for the wall 140. The mold can include a perimeter area that is to form a frame for the microlens array, the frame having a thickness many times that of the wall, for structural integrity and attachment of the wall to an image screen. In one embodiment, the frame can have bolt holes for attachment to a recording screen or a display screen.

The wall 140 can then be created 205 by placing molten or liquid material in the trench that will harden to form the wall. In one embodiment the wall material may be a metal or alloy such as aluminum, copper, iron or steel that has a lower melting point than that of the block material, which may be made of tungsten or titanium, for example. The molten or liquid wall material may be poured onto or into the mold and then hardened or allowed to harden. In one embodiment the wall material may be magnetic, and may have a magnetic field applied during hardening to magnetize the wall in one direction, so that after it has hardened a magnetic field can be employed to remove the wall from the mold. The wall surface may be processed at this time to reduce the reflectivity of the wall. For example, an iron or steel wall may be processed to convert the surface of the material into magnetite ($Fe_3O_4$), creating a black oxide coating on the wall.

Next, the microlenses are formed in the rectangular openings of the wall 210. This can be done in various ways.

For example, the wall 140 can be lowered into a fluid material such as a molten glass or polymer so that the material flows upward through the rectangular openings to create convex upper microlens surfaces that terminate adjacent to the upper surface of the wall, after which the transparent microlens material is hardened.

In another example, the surface tension of such a liquid microlens material can be utilized to form a convex upper surface of each microlens. For instance, the microlens material may be a transparent liquid such as a heated polymer or glass that is distributed over the wall 140 and into the rectangular cavities formed by the wall, the liquid having a slight (e.g., hydrophobic) repulsion to the top of the wall, with the excess liquid allowed or encouraged to run off. In this case, the repulsion can cause the liquid to avoid the top of the wall and the surface tension can cause the liquid to form a convex surface over each rectangular wall opening. The liquid may then be hardened to form the microlenses.

In another example, a negative photoresist can be distributed in a layer over the wall 140 and then patterned to remove the part of the layer that is atop the wall, leaving a pedestal over each rectangular space. The resist pedestals can then be melted to form convex surfaces atop each rectangular space. Although traditional masking and patterning can be employed, a self-aligned way to pattern the resist is to provide a collimated backlight that shines through the rectangular cavities but leaves the portions of the resist on top of the wall in the shadow of the wall, those portions being removed after development.

In another embodiment, a layer of transparent material such as glass may be formed over the wall 140 and the spaces between the wall, after which the transparent material is etched more near the wall than near the center of the rectangular spaces. For example, a voltage may be applied to the wall 140 during a reactive ion etch, which attracts ions to the wall and preferentially etches the layer until the top of the wall is exposed and a convex surface has been formed over the rectangular space. Optionally, the transparent material can then be heated to smooth or reshaped the convex surface.

In another example, for the situation in which the wall has a magnetic moment in the Z direction, magnetic field loops are concentrated at the center of each microlens. In this case, a magnetic glass or polymer that can be employed to form a convex surface of each microlens while the glass or polymer is liquid, after which the glass or polymer can be hardened. A magnetic glass is disclosed for example in U.S. Pat. No. 3,320,170 and a magnetic polymer is disclosed in U.S. Pat. No. 6,790,542.

Figure 13:
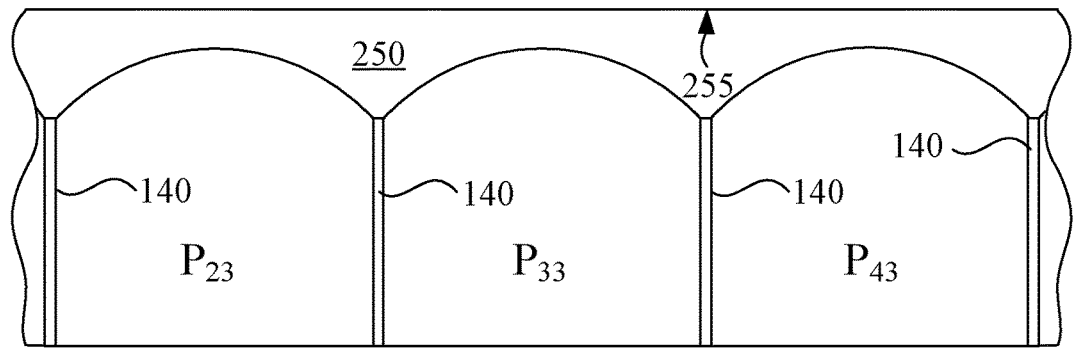
FIG. 13 is a cutaway cross-sectional view of a portion of a microlens array, viewed in the X-Z plane of FIG. 3B.

In any of the above examples, after the microlenses have been formed, a transparent protective coating may be formed over the top of the microlens array. FIG. 13 is a cutaway cross-sectional view of a portion of such a microlens array, viewed in the X-Z plane of FIG. 3B. FIG. 13 shows three microlenses, $P_{23}$, $P_{33}$ and $P_{43}$, separated by wall 140. A protective coating 250 is disposed over the top of the microlens array, the coating having a flat upper surface 255 and an index of refraction between that of the microlenses and that of air to reduce chromatic aberration.

FIG. 14 shows a portion of wall 140 that adjoins the elongate sides of microlenses $P_{23}$, $P_{33}$ and $P_{43}$. The wall is arched next to each of the $P_{23}$, $P_{33}$ and $P_{43}$, to better fit the curvature of the microlens surfaces.

In some embodiments, the microlenses are formed to have two convex surfaces. This also can be accomplished in various ways. Initially, the rectangular openings within the wall may be filled with a transparent filler material having an index of refraction less than that of the microlenses. The filler material can be formed to have a concave upper surface within each rectangular space, which will become a convex lower surface of each microlens.

The upper surface of the filler material can be shaped in various ways. For example, the filler material can have a slight (e.g., hydrophilic) attraction to the surface of the wall 140, so that the upper surface of the filler material curves upward as it meets the wall, like a meniscus at the top of a glass of water. As another example, the filler material can be formed to the top of the wall and then etched to form a concave upper surface, for example by using an anisotropic etch that removes more of the filler material further from the wall than adjacent to the wall. For example, rotation or other variation of the direction in which ions or electrons approach the surface during etching can preferentially shield filler material nearest the wall, compared to filler material furthest from the wall resulting in a concave surface.

After a concave surface has been formed on the top of the transparent filler material, a microlens is formed within each rectangular cavity defined by the wall and that surface, the microlens made of a material having a higher refractive index than that of the filler material. The upper convex surface of the microlenses may be formed by some of the same techniques described above for making the planar-convex lensing surface. The microlens material may be a glass or a high refractive index polymer, for instance.

In one example, the microlens material may be a transparent liquid such as a melted glass or polymer that is distributed over the wall 140 and into the rectangular cavities formed by the wall, the liquid having a slight (e.g., hydrophobic) repulsion to the wall, with the excess liquid allowed or encouraged to run off. In this case, the repulsion can cause the liquid to avoid the top of the wall and the surface tension can cause the liquid to form a convex surface over each rectangular wall opening. The liquid may then be hardened to form the microlenses. Other examples include preferential etching that can involve electrical voltage or magnetic moment of the wall 140, as described above. For the situation in which a negative photoresist is distributed into the cavities and in a layer atop the wall 140 and cavities, backlighting may be somewhat focused by the lower convex surface of the resist, which can result in narrower pedestals that remain after development. Alternatively, such a layer of photoresist can be patterned from above to form pedestals that are then melted to form an upper convex surface.

Figure 15:
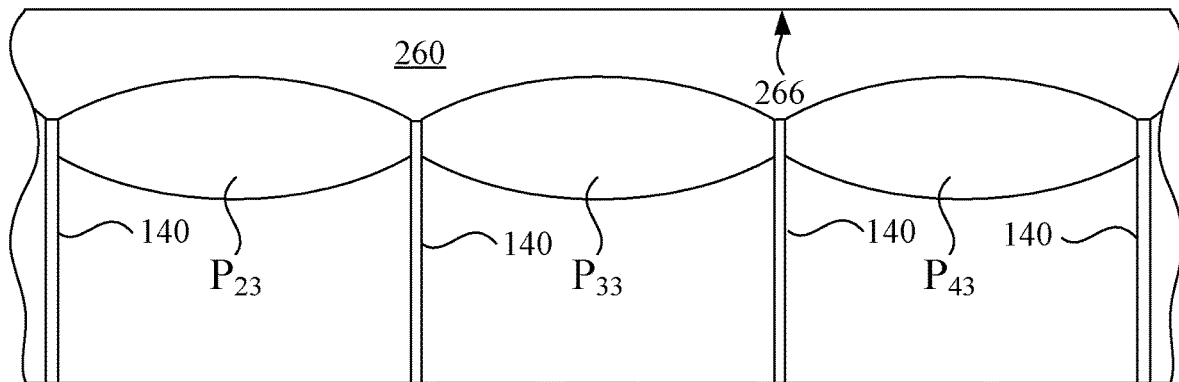
FIG. 15 is a cutaway cross-sectional view of a portion of a microlens array, viewed in the X-Z plane of FIG. 5B.

In any of the above examples, after the bi-convex microlenses have been formed, a transparent protective coating may be formed over the top of the microlens array. FIG. 15 is a cutaway cross-sectional view of a portion of such a microlens array, viewed in the X-Z plane of FIG. 5B. FIG. 15 shows three microlenses, $P_{23}$, $P_{33}$ and $P_{43}$, separated by wall 140. A protective coating 260 is disposed over the top of the microlens array, the coating having a flat upper surface 266 and an index of refraction between that of the microlenses and that of air to reduce chromatic aberration.

Referring again to FIG. 12, the microlens array is then combined with an image screen, such as a recording screen or a display screen, to create an imaging system. In one embodiment, an image screen can be formed separately from the MLA and then attached to the MLA to form a 3D image system 215. In another embodiment, an image screen may be fabricated on the microlens array to form a 3D image system 220.

In some embodiments, an image screen such as an OLED display, a LCD display or a photographic or other print display that is designed to be used with the microlens array can be formed separately from the MLA and then attached to the MLA. In one embodiment, an image screen such as an OLED display may be fabricated on the microlens array to form a 3D image display system. In one embodiment, microlens array may be fabricated on top of an image screen such as an OLED display or LCD display to form a 3D image display system.

OLED displays can be built in various ways. In some designs, light is designed to emerge from the glass seal at the top; others send their light through the substrate at the bottom. For a 3D display system in which an OLED display is fabricated on a MLA, the MLA may be flipped over so that it can serve as the substrate upon which the OLED display screen is built, and through which the OLED display screen will transmit light. In this case it is important that the MLA has been made to withstand the temperatures encountered in the OLED fabrication process. For a 3D image display in which a MLA is fabricated on the glass seal at the top of an OLED display, it is important that the OLED has been made to withstand the temperatures encountered in the MLA fabrication process.

Figure 16:
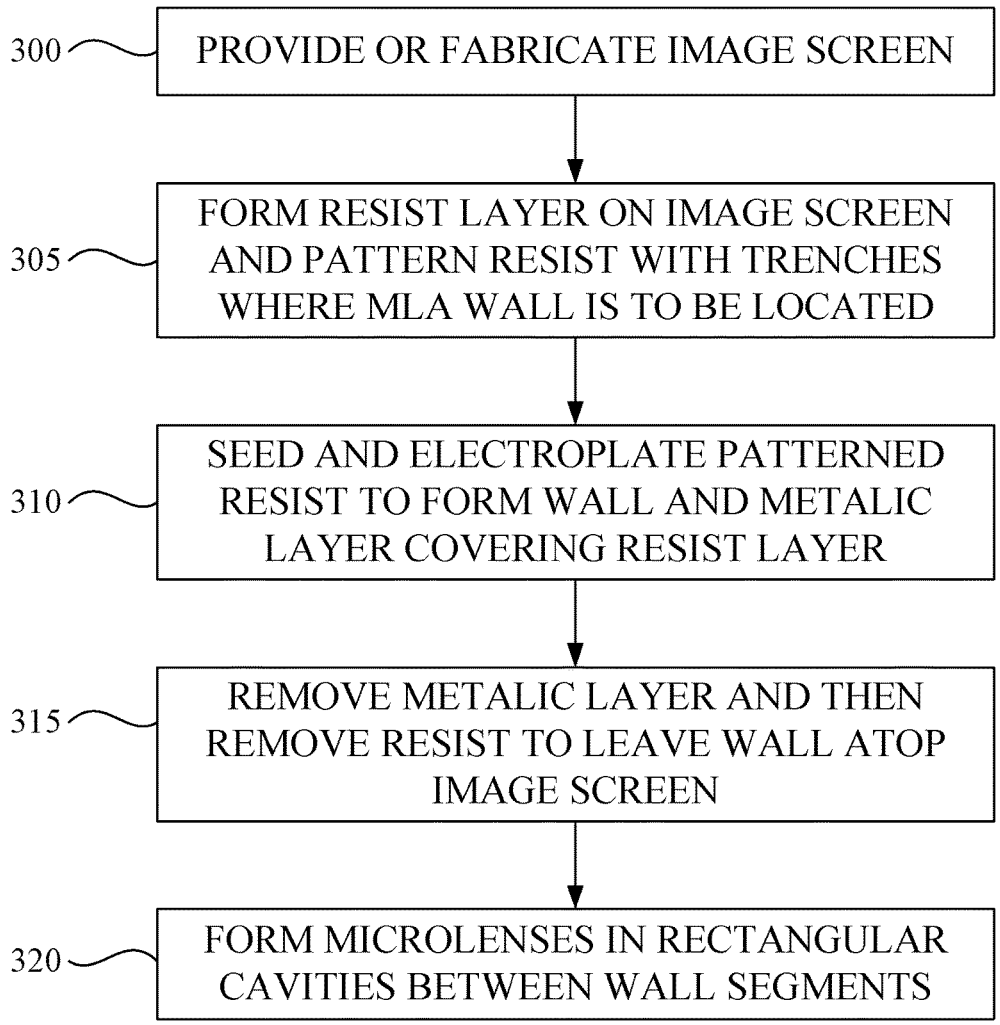
FIG. 16 is a flow chart of a method for making a microlens array on top of an image screen.

As shown in FIG. 16, in one embodiment a MLA can be fabricated on top of an image screen to form an image system. In this case, an image screen such as a recording screen or a display screen is first provided 300. In one embodiment, a display screen such as an OLED display is first fabricated according to known techniques. It is generally preferred to use a stacked OLED display, in which red, green and blue light emitting elements are layered on top of each other to form each spot or pixel, which offers higher resolution than an OLED display in which the red, green and blue light emitting elements are disposed side by side. On top of a stacked OLED, a layer of photoresist is deposited and then masked and patterned to leave trenches in locations where the wall is to be formed 305. Along with the rectangular array of trenches that is to become the wall, a broader trench that will become a frame for the microlens array can be part of the photoresist pattern. Optionally, posts of photoresist can be patterned to protrude from the broad trench, the posts designed to become bolt holes in the frame. A metal such as iron, copper, titanium, tungsten, etc. is then vapor deposited on the patterned resist, for example by chemical vapor deposition (CVD) using an organo-metallic vapor. The deposition forms a coating on the patterned resist, including in the trenches, that may be then be used for electroplating a thicker layer of the same or a different metal, which fills the trenches and coats the top of the resist 310. The metal layer on top of the resist is then removed, for example by chemical mechanical polishing (CMP) or etching, including removing the top of the filled trenches but leaving the remainder of the trenches intact to form the wall 140. In one embodiment, CMP or etching can be employed to create the arched top to the wall shown in FIG. 14. The developed photoresist that is left in the rectangular areas between the wall is then chemically removed 315. Microlenses can then be formed in the rectangular spaces, as discussed above, to create a MLA atop the OLED 320.

Similar to the fabrication of 3D display systems described above, a 3D recording system can be made by attaching a MLA to a recording screen such as a CMOS sensor array or a photographic film. Alternatively, a recording screen such as a CMOS sensor array may be fabricated on the microlens array to form a 3D image recording system, much as described above, for example with regard to FIG. 12. In another embodiment, a microlens array may be fabricated on top of a recording screen such as a CMOS sensor array or other active pixel sensor to form a 3D image display system, much as described above, for example with regard to FIG. 12. Alternatively, instead of fabricating a MLA on top of a display or recording screen, a MLA can be fabricated according to steps 305-320 and then attached to the image screen.

For a 3D display system in which an CMOS sensor array is fabricated on a MLA, the MLA may be flipped over so that it can serve as the substrate upon which the CMOS sensor array is built, and through which the CMOS sensor array will receive light. That is, a back illuminated CMOS sensor may be built on the MLA surface furthest from the microlenses. In this case it is important that the MLA has been made to withstand the temperatures encountered in the CMOS sensor array fabrication process. On the other hand, for a 3D image display in which a MLA is fabricated on the top of an CMOS sensor array, it is important that the CMOS sensor array has been made to withstand the temperatures encountered in the MLA fabrication process.

Figure 17:
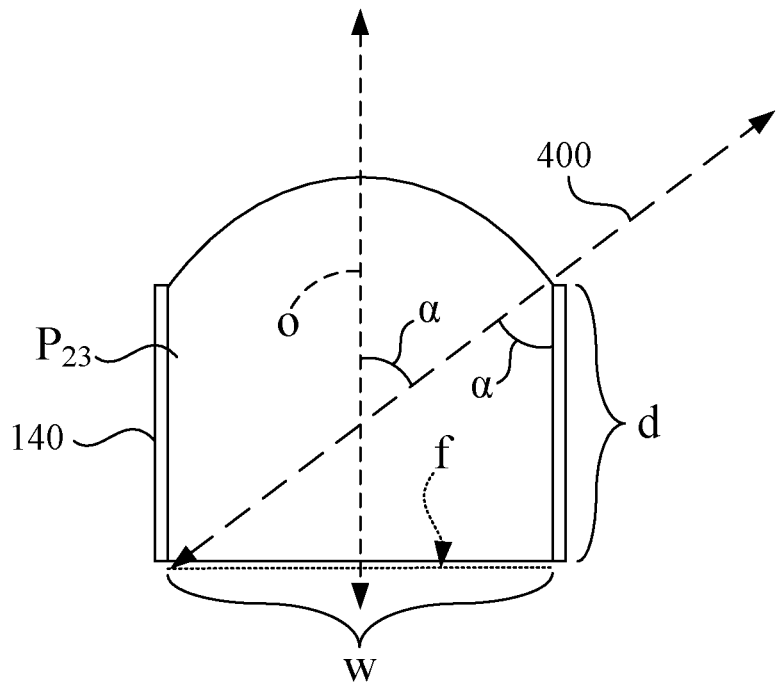
FIG. 17 is a cross-sectional view of the microlens of FIG. 3A, FIG. 3B and FIG. 3C that shows the angle of view in the horizontal or lateral direction, i.e., in the X-Z plane.
Figure 18:
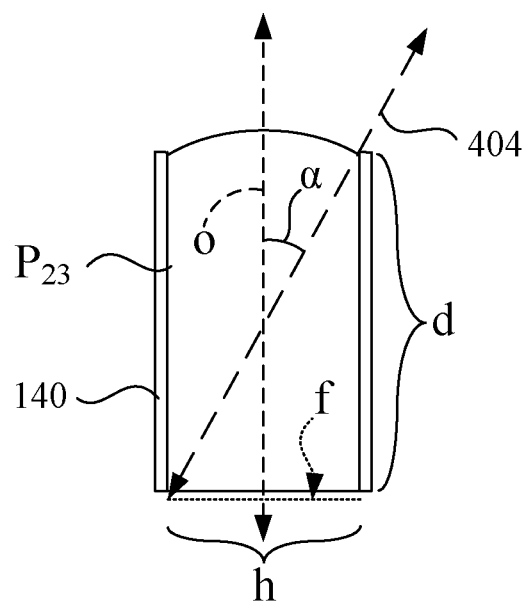
FIG. 18 is a cross-sectional view of the microlens of FIG. 17 that shows the angle of view in the vertical direction, i.e., in the Y-Z plane.

FIG. 17 and FIG. 18 illustrate an angle of view for microlens $P_{23}$ of array 102. The angle of view is defined as the angle over which a microlens can transmit or receive light external to the microlens. FIG. 17 is a cross-sectional view of microlens $P_{23}$ that explains the angle of view in the horizontal or lateral direction, i.e., in the X-Z plane of FIG. 3B. FIG. 18 is a cross-sectional view of microlens $P_{23}$ that explains the angle of view in the vertical direction, i.e., in the Y-Z plane of FIG. 3C. As shown in FIG. 17 and FIG. 18, the focal plane f is disposed just below the microlens $P_{23}$, where an array of light sensing or light transmitting spots may be located, but in other embodiments the focal plane f may be slightly above or coterminous with the bottom of the microlens $P_{23}$. In any event, the focal plane may be approximately coterminous with the bottom of the microlens $P_{23}$ and the top of an image screen, and is limited by the wall 140 to have dimensions and an aspect ratio that is similar to the dimensions and aspect ratio of the microlens in the X and Y directions.

As shown in FIG. 17, the largest angle $\alpha$ that an external ray of light 400 can make with the optical axis o, which is normal to the face of array 102, is determined essentially by the depth d of the wall 140 compared to the width w of the microlens $P_{23}$, along with the curvature and refractive index of the microlens $P_{23}$. To a first approximation for this embodiment, the tangent of angle $\alpha$ is approximately equal to the width w divided by the depth d, and $\alpha$ is approximately equal to the arctangent of w/d. For example, when the depth d is twice the width w, $\alpha$ is about 26 degrees, when the depth d is 3/2 the width, $\alpha$ is about 33 degrees, when the depth d is equal to the width, $\alpha$ is about 45 degrees, when the depth d is ⅔ the width, $\alpha$ is about 56 degrees and when the depth d is one-half the width, $\alpha$ is about 63 degrees. The angle of view in this horizontal or X direction is, to a first approximation, double the angle $\alpha$, i.e., twice the arctangent of w/d.

FIG. 18 shows the largest angle $\beta$ that a ray of light 404 can make with the optical axis o in the narrower, vertical direction. Much as described above for the horizontal direction, angle $\beta$ is determined to a first order essentially by the ratio of the depth d of the wall 140 to the height h of the microlens $P_{23}$. That is, the tangent of angle $\beta$ is approximately equal to the height h divided by the depth d, and $\beta$ is approximately equal to the arctangent of h/d. The angle of view in this vertical direction is, to a first approximation, double the angle i.e., twice the arctangent of h/d. Note that the depth d of the wall 140 is larger in FIG. 18 than in FIG. 17 due to the arch of the wall along the elongate side of the rectangular microlens $P_{23}$. To exploit the lateral displacement of people's eyes, in one embodiment the angle of view in the horizontal direction is at least about fifty percent greater than in the vertical direction, and preferably at least seventy-five or one hundred percent greater. The angle of view can be determined empirically by simply observing the angles over which light from a particular microlens can be transmitted or the angles at which light can received by such a microlens.

Figure 19:
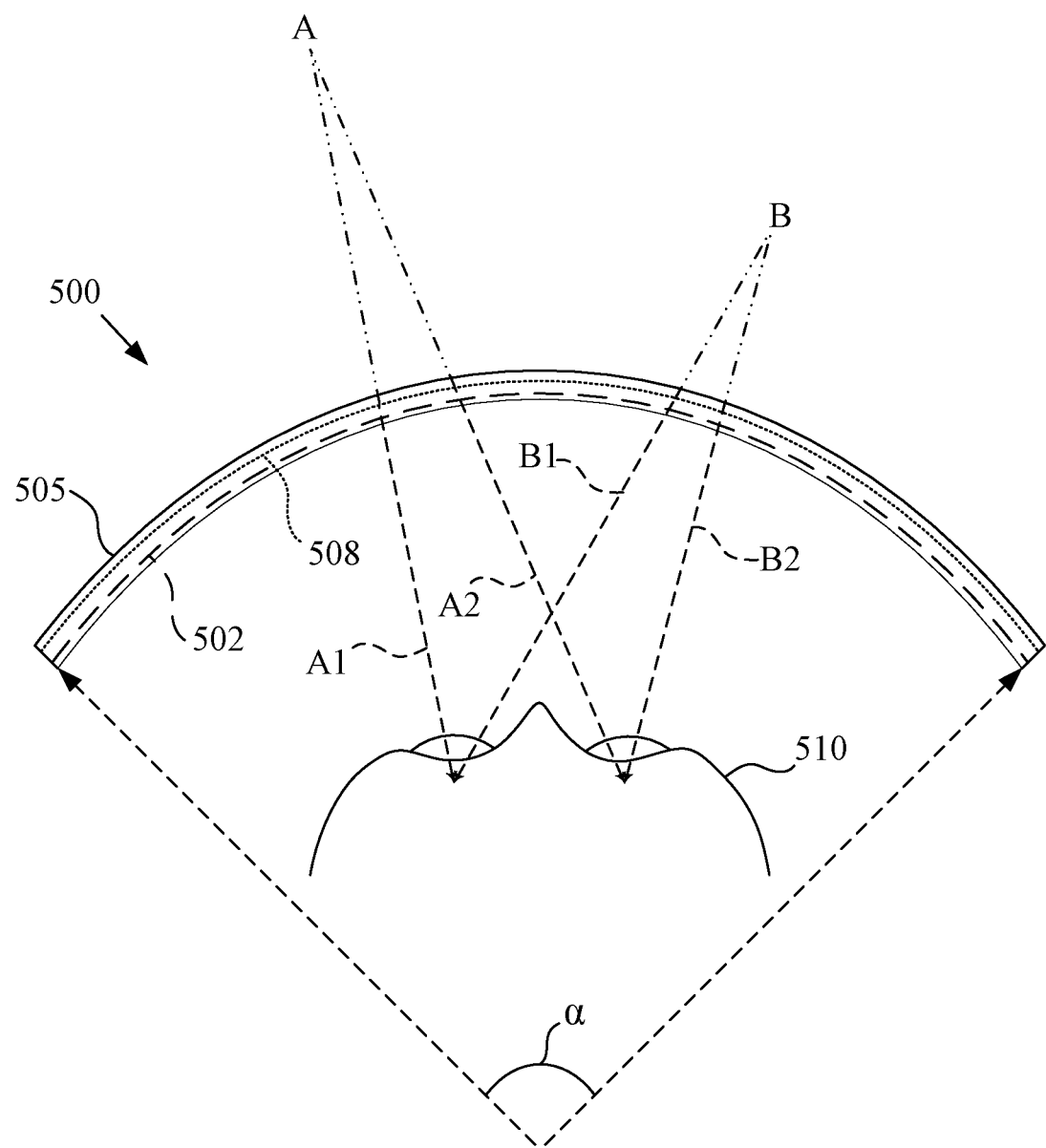
FIG. 19 is a diagram of an embodiment of a display system that is curved in the lateral direction.

FIG. 19 is a diagram of an embodiment of a display system 500 that is curved in the lateral direction, illustrating a cross-sectional view in an X-Z plane. Such a curved display system may have particular utility in a virtual reality or augmented reality system that is attached to a person's head 510, as well other uses for a system that is not attached. Such a system need not have rectangular microlenses that are elongated in the lateral direction, because the curvature provides enhanced resolution and angle of view in the lateral direction, although rectangular elongate microlenses may offer other benefits in an embodiment having a curved display screen. The attachment of the display to a person's head can be accomplished with a conventional head mounting apparatus, such as a harness or strap that is tightened around the head.

The display system 500 includes a curved microlens array 502 that is represented in this diagram as a dashed line, in which each of the dashes can be thought of as a microlens. Of course, a real display would have many more microlenses, each one small enough to be essentially imperceptible. A curved display screen 505 is disposed adjacent to the microlens array, the display screen having an array of display spots 508 that transmit light through the microlenses. As with prior embodiments, the display spots 508 are divided into groups, with each of the groups corresponding to a different one of the microlenses, and a wall preferably separating each microlens from the other microlenses, the wall not shown in this diagram. The group of spots corresponding to each microlens is preferably located at or near a focal plane for the microlens.

FIG. 19 depicts that a few of the spots 508 on display screen 505 are transmitting light through their respective microlenses of microlens array 502 to create images A and B. That is, light rays A1 and A2 are directed to the person's left and right eyes to form image A behind the screen. Similarly, light rays B1 and B2 are directed to the person's left and right eyes to form image B behind the screen. Like embodiments having a flat display screen, the transmission pattern of display screen 508 may be computer generated, and may involve a mapping of an image recorded on a recording device or may be fabricated without prior recording. For the case in which a recording system is used to record images that are later displayed, that recording system may be curved like display system 500. The concave curvature of the system 500 allows images such as A and B to be formed at angles that are relatively close to the optical axis for each microlens, as can be seen by rays A1, A2, B1 and B2, allowing microlens apertures to be smaller and improving focus. To provide enhanced viewing, the microlens array 502 and display screen 505 curve over an angle $\alpha$ that is somewhat more than 1 radian in this embodiment, although smaller and larger angles are contemplated. For similar reasons, a preferred radius of curvature for a head-mounted display system such as system 500 is between about 10 centimeters and 40 centimeters, and more preferably between about 16 centimeters and 30 centimeters.

Figure 20:
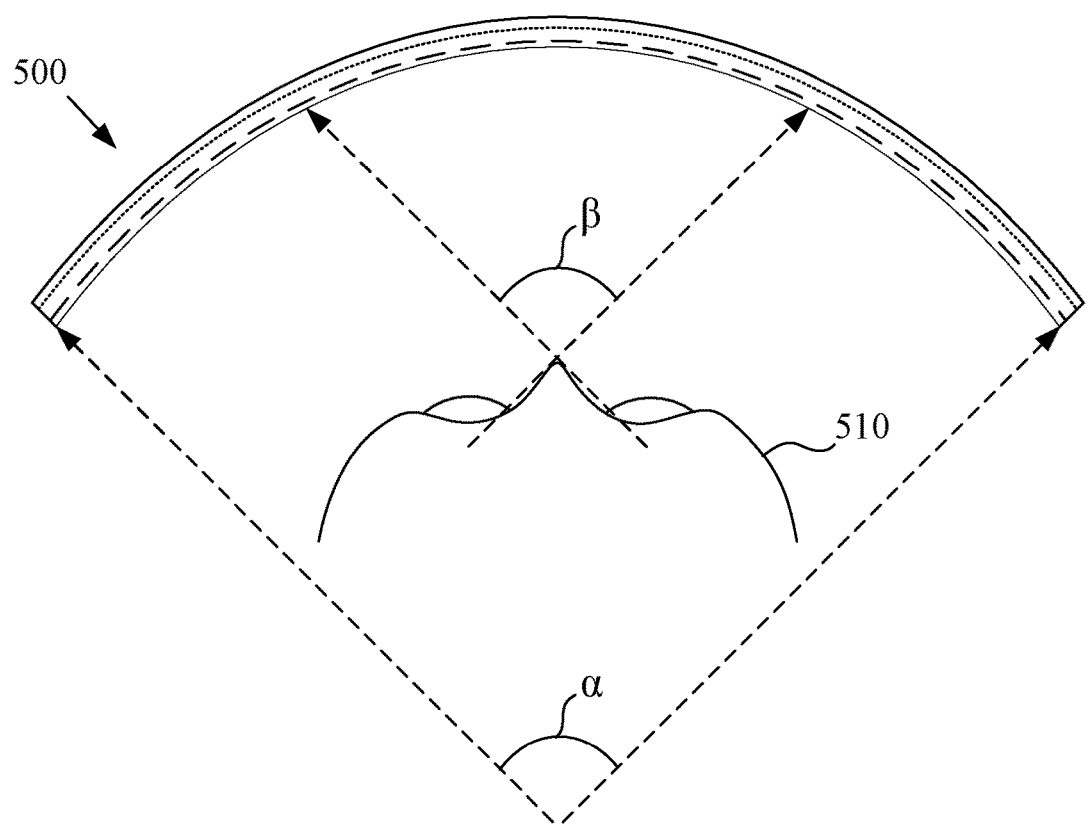
FIG. 20 is a diagram showing the system of FIG. 19 and a maximum angle over which a person can see an item with both eyes.

FIG. 20 is a diagram showing the system 500 of FIG. 19 as well as a maximum angle $\beta$ over which a person can see an item with both eyes. The angle $\beta$ is determined by the maximum angle at which each eye can rotate inward before its view is obstructed by the bridge of the person's nose. In the example shown in FIG. 20, β is somewhat greater than 1 radian, when measured from the bridge of the person's nose. One result of this is that, for an embodiment in which system 500 is attached at a fixed distance from a person's eyes, a display screen only needs to have 3D capabilities, such as an array of spots corresponding to each microlens, for an angle of less than about 1.5 radians. The remainder of the screen that can be seen peripherally by one eye or the other may, for example, be comprised of spots that are not covered by a microlens or may be covered with microlenses with smaller apertures that direct light toward the one eye that can view it. FIG. 20 also shows that even for light that originates at the maximum eye rotation before being obscured by part of the nose, the angle from the optical axis is not large due to the curvature of the system 500. Preferably, the radius of curvature for a head-mounted display system such as system 500 is greater than a distance between the center of the display screen and the bridge of the person's nose, and may be close to twice that distance.

Figure 21:
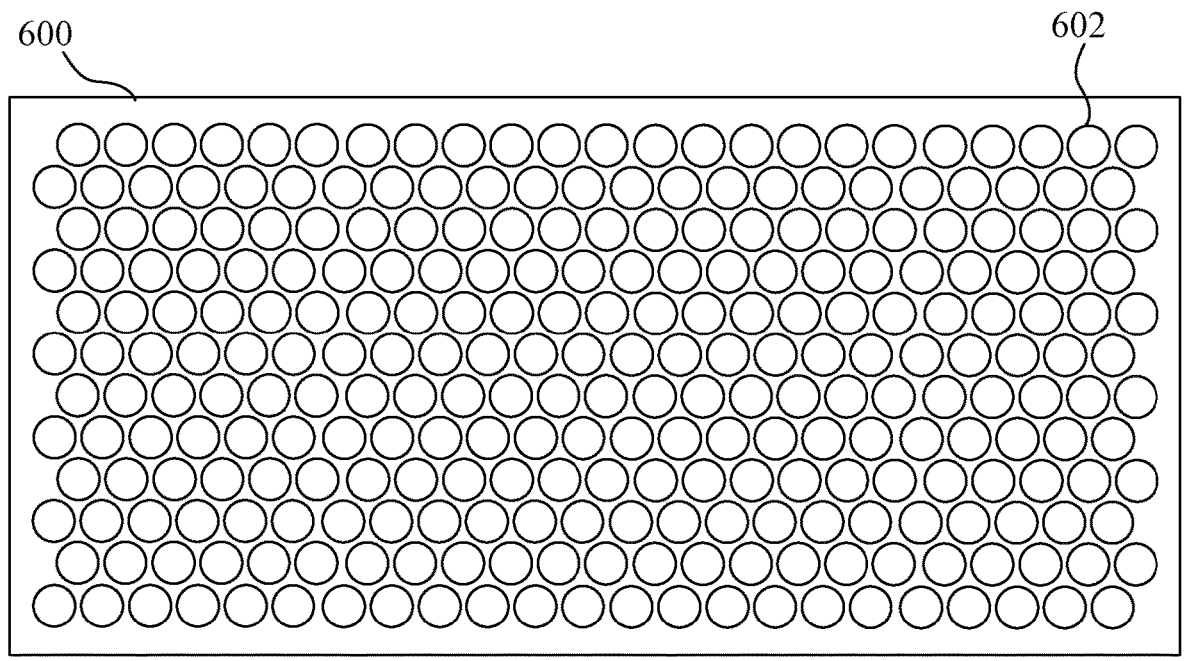
FIG. 21 is a front view of a frame that is used in making a microlens array that may be employed in a curved imaging system such as that shown in FIG. 20.

FIG. 21 is a front view of a frame 600 that may be used in forming a microlens array that may be employed in a curved imaging system such as that shown in FIG. 20. In one embodiment, the frame 600 for the microlens array may be created for example from a thin sheet of metal, polymer or other hard, opaque material that has been patterned and etched with conventional photolithography as known in the art of semiconductor processing. The frame 600 may have circular openings 602 for the microlenses within a hexagonal array, as shown, or may have other openings or arrangements, such as elongate rectangular openings or a square rectangular arrangement with circular openings. In one embodiment, the microlens openings 602 may have a diameter in a range between 10 microns and 200 microns, preferably in a range between 20 microns and 100 microns, and most preferably in a range between 30 microns and 80 microns.

Figure 22:
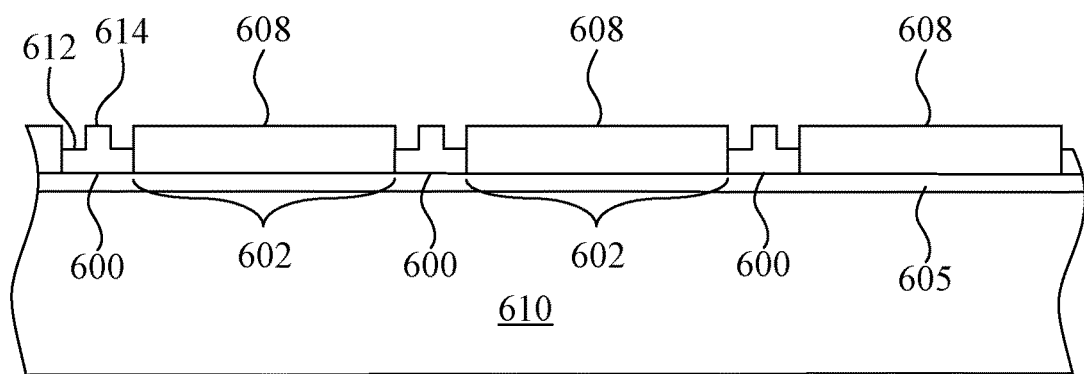
FIG. 22 is a cutaway cross-sectional view of a later step in the fabrication of the system of FIG. 19, in which the frame of FIG. 21 sits on a substrate and openings of the frame are filled with photoresist pedestals.

FIG. 22 is a cutaway cross-sectional view of a later step in the fabrication of system 500. In FIG. 22, frame 600 is disposed atop a substrate 610, which may in one embodiment be glass or another material that is transparent to the light that is used for developing photoresist. Between the sections of frame 600 shown in FIG. 22 are the openings 602, which have been filled with photoresist pedestals 608. The frame 600 can be seen in this cross-sectional view to have a part 612 that adjoins the pedestal and a part 614 that is removed from the pedestal. Parts 612 and 614 may be two layers of the frame 600, and may have been formed by separate masking and etching steps.

In one embodiment, on top of a silicon substrate 610 a sacrificial layer of silicon dioxide 605 may be formed, followed by a layer of silicon that will become the frame 600 and has a thickness equal to that of parts 612 and 614 combined. For example, the thickness of the frame may be in a range between three microns and twenty microns. A photoresist layer deposited on the silicon layer may then be patterned to leave openings in the resist through which the silicon layer is then etched to create openings 602. Optional through-holes may also be created at that time at a midpoint between each set of three openings 602, to increase flexibility and to assist in later chemical release of the frame 600 from the substrate 610. The frame 600, perforated by through-holes and openings 602, may then be coated again with photoresist that is patterned to leave apertures having a diameter slightly larger than openings 602, through which the silicon layer is partially etched to create parts 614 on top of parts 612 created by openings 602. In another embodiment, a first layer of metal frame material may be deposited on substrate 610 atop a sacrificial layer 605 and patterned to form openings 602, optional through-holes and parts 612, and then a second layer of frame material may be patterned atop parts 612, for example by leaving openings in a photoresist layer where parts 614 are to be located, then seeding, electroplating, lapping and removing the remaining resist to create parts 614.

Pedestals 608 may be formed in one embodiment by applying a layer of photoresist over the frame 600, for example by spin coating, exposing the photoresist to light that develops parts of the resist, and then removing the resist that was atop the frame sections. In one embodiment using a negative photoresist, the frame can provide the mask for light that is shined through a transparent substrate, leaving the unexposed resist atop the frame sections, after which the unexposed resist is chemically removed to create pedestals 608. A positive or negative photoresist can instead be used with an appropriate mask that is disposed on top of the resist to create the pedestals 608 for the situation in which the substrate 610 is not transparent, by removing the portion of the resist layer that is atop frame 600 after the pedestal resist has been developed. In one embodiment, photoresist mounds may be deposited by 3D printing instead of being fashioned by photolithography.

In one embodiment, the frame 600 may be made of a metal such as copper, brass, iron, steel, nickel, etc., which may be processed to lower its reflectivity, for example by a black oxide process, prior to creating the pedestals. In one embodiment, the frame 600, including parts 612 and 614, may have a thickness that is less than half of the diameter of opening 602, and preferably less than thirty percent of the opening diameter, to provide sufficient flexibility to allow the frame to be changed from the flat shape shown in FIG. 22 to the curved shape shown in FIG. 19. For example, part 612 may have a thickness of 5 microns, part 614 may have a thickness of 6 microns, and opening 602 may have a diameter of 60 microns.

Figure 23:
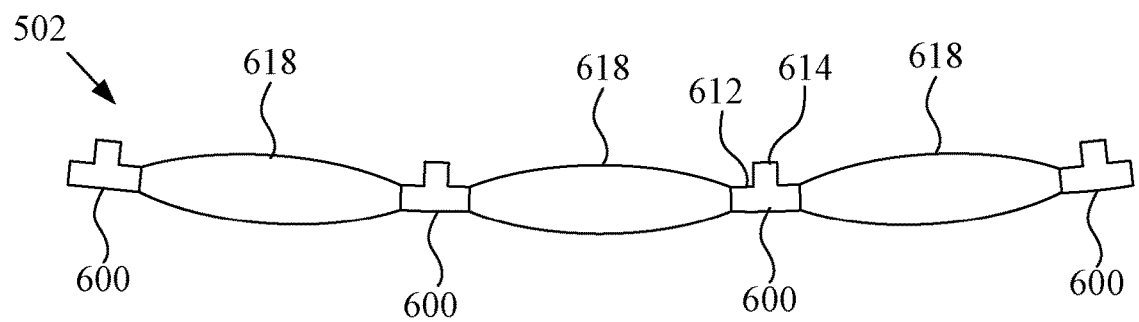
FIG. 23 is a cross-sectional view of a later step in the fabrication of the system of FIG. 19, in which the frame of FIG. 22 is slightly curved and the photoresist pedestals have been melted to form microlenses.

FIG. 23 is a cross-sectional view of a later step in the fabrication of system 500, in which the frame 600 of FIG. 22 has been removed from the substrate 610, for example by wet etching the sacrificial layer 605, and the photoresist pedestals have been melted to form microlenses 618 by thermal reflow processing. Thermal reflow processing, in which photoresist pedestals are melted to form convex surfaces and then hardened, is well known in the art of microlens fabrication, and for microlenses 618 having a diameter on the order of 100 microns the surface tension of the melted photoresist and the volume of the pedestals primarily determine the curvature of the surfaces, with gravity playing little role in the curvature. Examples of the formation of bi-convex microlenses by such thermal reflow processing of photoresist are given in the article by Richard R. A. Syms entitled "Refractive Collimating Microlens Arrays by Surface Tension Self-Assembly," IEEE Photonics Technology Letters, Vol. 12, No. 11, November 2000, pp. 1507-1509, the entire contents of which are incorporated by reference herein. The frame 600 may be curved slightly, for example by holding the ends of the frame with a device that bends the frame, so that the microlens array 502 is curved as shown in FIG. 19. The curvature shown in FIG. 23 is exaggerated compared to FIG. 19 to facilitate understanding.

Bi-convex microlenses 618 in this embodiment have less curvature than the other microlenses disclosed above, and the focal points and focal planes for microlenses 618 are disposed at a greater distance compared to the diameter of the microlenses. This is because the angle of view for a display system 500 having a concave display screen can be reduced, which can sharpen the focus. For example, the microlenses 618 have a focal length that is greater than their diameter, and may have a focal length that is at least fifty percent greater than their diameter. For a system 500 that has an array of display spots that are disposed approximately at a focal plane of the microlens 618, an opaque wall that separates the light from those display spots from other display spots that correspond to other microlenses may have a depth that is about equal to the focal length. In other words, such a wall may have a depth, measured in a direction orthogonal to the plane of the microlens, that is greater than the microlens' diameter, and may have a depth that is at least fifty percent greater than its diameter.

Figure 24:
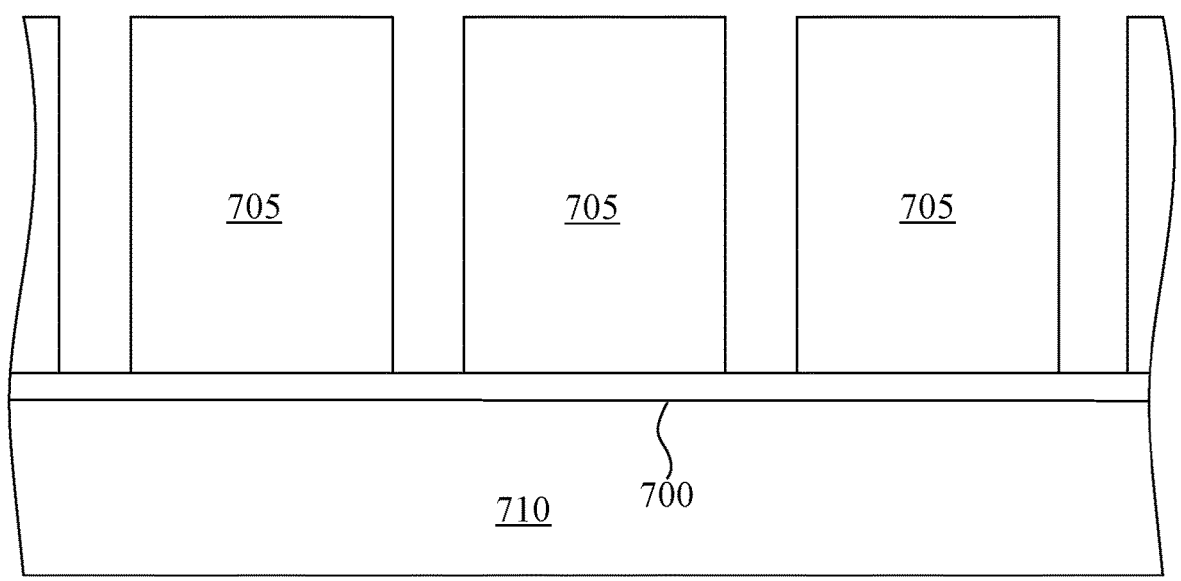
FIG. 24 is a cutaway cross-sectional view of a step in the fabrication of an opaque wall for the system of FIG. 19, in which photoresist cylinders have been formed, between which the wall will be defined.

FIG. 24 is a cutaway cross-sectional view of a step in the fabrication of an opaque wall for system 500. In FIG. 24, a thin substrate layer 700 is disposed atop a thicker, rigid substrate 710, which provides support to substrate layer 700 during initial processing. In one embodiment, substrate layer may be made of an electrically conductive metal such as aluminum, copper, iron or nickel or alloys of such metals. The substrate layer 700 may be very thin sheet metal that is easily removed from substrate 710. Alternatively, such a metal layer may have been formed for example by vapor deposition of a seed layer, electroplating and polishing atop substrate 710 in a manner that allows for its removal, for example atop a sacrificial layer and perforated with through-holes in areas where cylinders 705 will later be formed. In another example, the substrate layer 700 may be made of a semiconductor or insulator, such as glass, which can be removed from substrate 710 by wet etching substrate 710, or wet etching a sacrificial layer located between substrates 700 and 710, via through-holes in substrate 700. A layer of photoresist has been deposited atop the substrate layer 700 and patterned to leave resist cylinders 705 that have approximately the same diameter as that of the openings 602 of the microlens frame, not shown in this figure.

Figure 25:
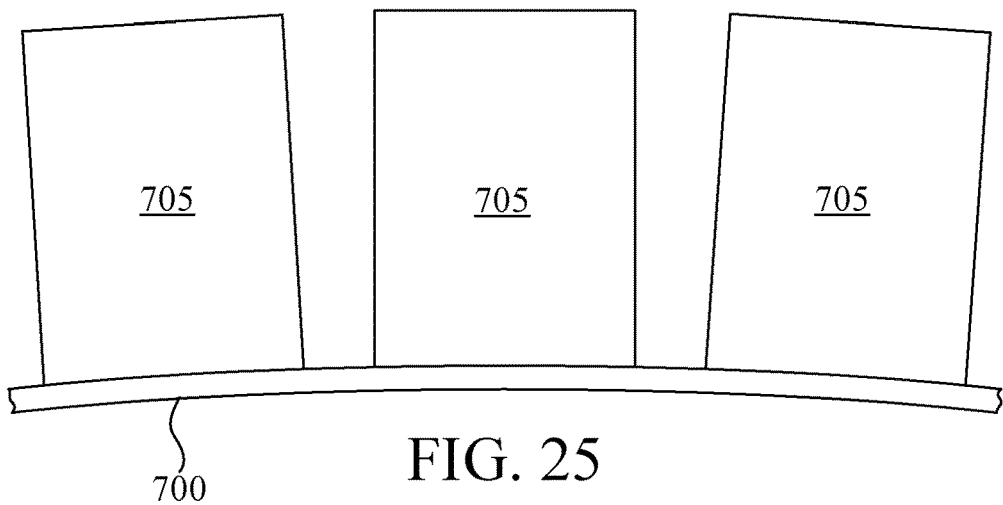
FIG. 25 is a cutaway cross-sectional view of the cylinders of FIG. 24 disposed on a substrate layer that has the curvature of the system of FIG. 19.

FIG. 25 is a cutaway cross-sectional view of the cylinders 705 and substrate layer 700 after substrate 710 has been removed and substrate 700 has been curved with approximately the curvature of system 500. In one embodiment, substrate layer 700 may be held against a working surface having a semi-cylindrical curvature, or other curvature approximately matching that of microlens array 502 of FIG. 19. The curvature shown in FIG. 25 is exaggerated compared to FIG. 19 to facilitate understanding.

Figure 26:
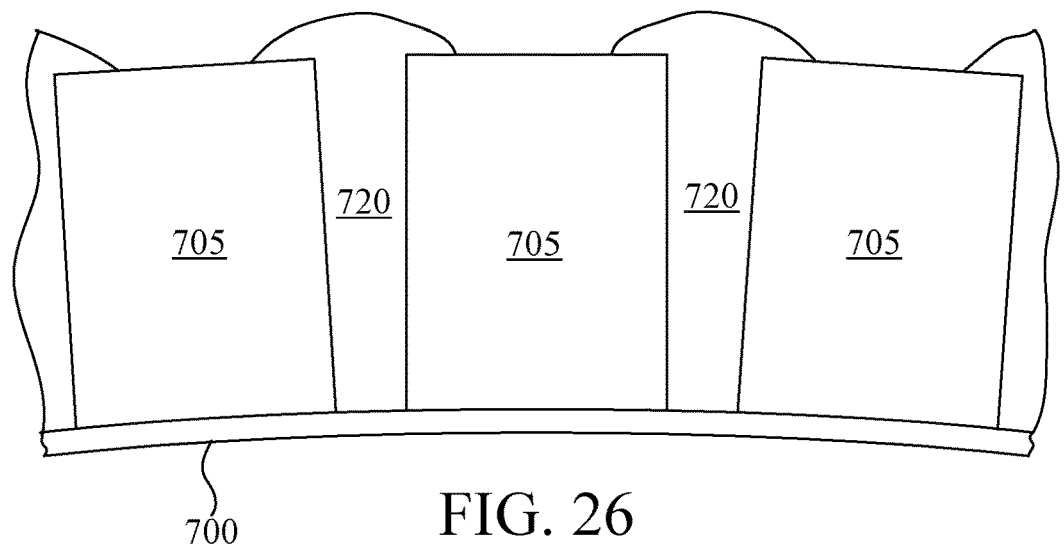
FIG. 26 is a cutaway cross-sectional view of a later step in the fabrication of the opaque wall for the system of FIG. 19, in which the curved substrate layer is electrically conductive and a metal filling has been electroplated in the gaps between the cylinders of FIG. 25.

In FIG. 26, layer 700 is electrically conductive, or at least has an electrically conductive surface layer facing cylinders 705, and a metal filling 720 has been electroplated in the gaps between the cylinders 705. In the example shown in FIG. 26, the filling has grown beyond the tops of the pedestals to form caps that are mushroom shaped in this cross-sectional view. In one embodiment the filling 720 material may be a metal or alloy such as aluminum, copper, brass, iron, nickel or steel.

Figure 27:
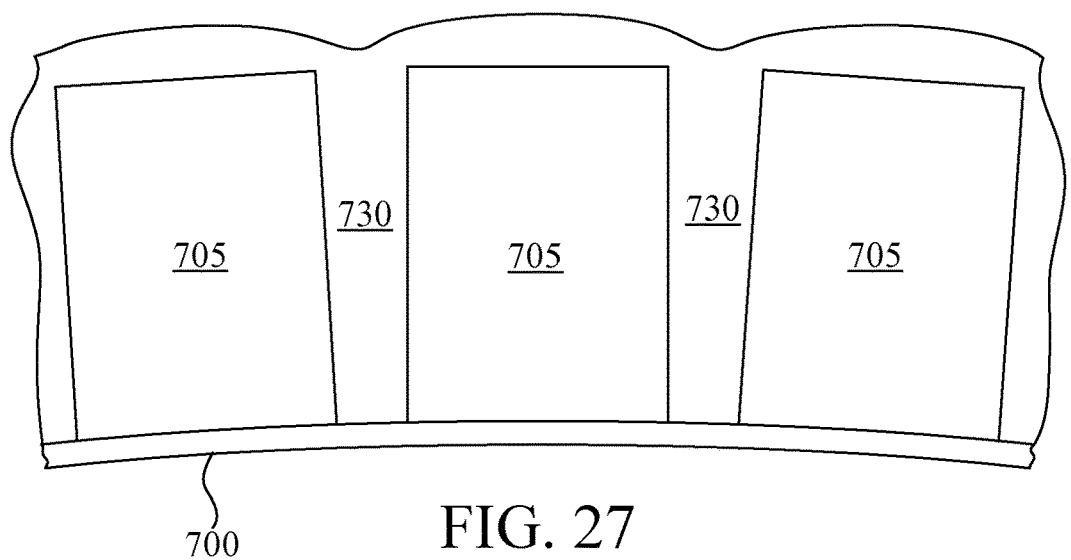
FIG. 27 is a cutaway cross-sectional view of a later step in the fabrication of the opaque wall for the system of FIG. 19, in which the curved substrate layer is electrically insulating and a metal filling has been electroplated in the gaps between the cylinders of FIG. 25.

In FIG. 27, layer 700 is electrically insulating, and a metal filling 730 has been electroplated on and between the cylinders 705, after an electrically conductive seed layer was deposited on the exposed portions of layer 700 and on and between cylinders 705. In one embodiment the filling 720 material may be a metal or alloy such as aluminum, copper, brass, iron, nickel or steel.

Figure 28:
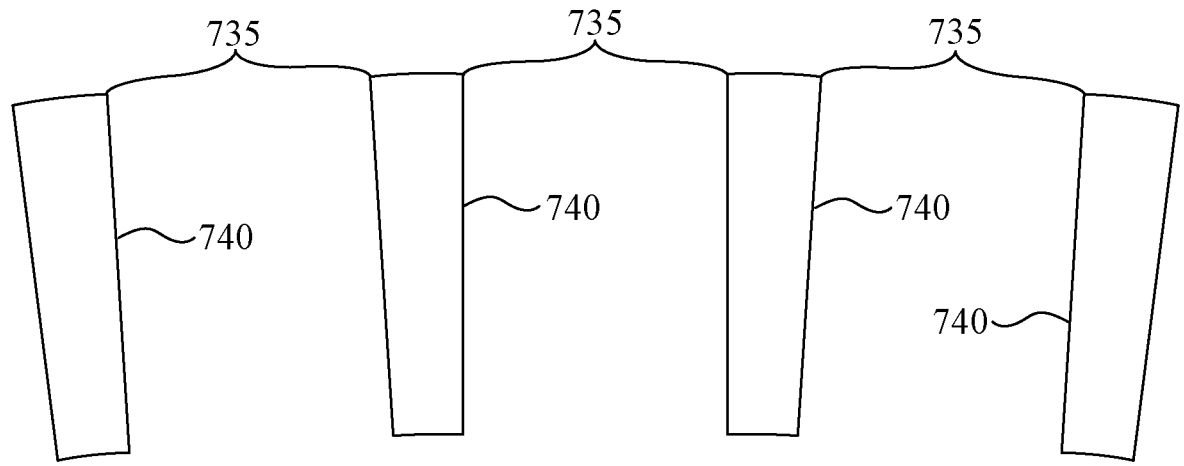
FIG. 28 is a cutaway cross-sectional view of wall sections that remain after the substrate, resist cylinders and any metal filling that was disposed on top of the cylinders in FIG. 26 or FIG. 27 have been removed.

FIG. 28 is a cutaway cross-sectional view of wall sections 740 that remain after substrate 700, resist cylinders 705 and any metal filling that was disposed on top of the cylinders 705 in FIG. 26 or FIG. 27 have been removed. Metal filling 720 or 730 that was disposed on top of the cylinders 705 in FIG. 26 or FIG. 27, respectively, may be removed by magnetorheological finishing or other known polishing techniques, and substrate layer 700 may also be removed by magnetorheological finishing or other known polishing techniques. Resist cylinders 705 may then be chemically removed to leave a curved array of cylindrical cavities 735 that are separated from each other by a wall 740, a small cross-section of which appears as the wall sections 740.

Figure 29:
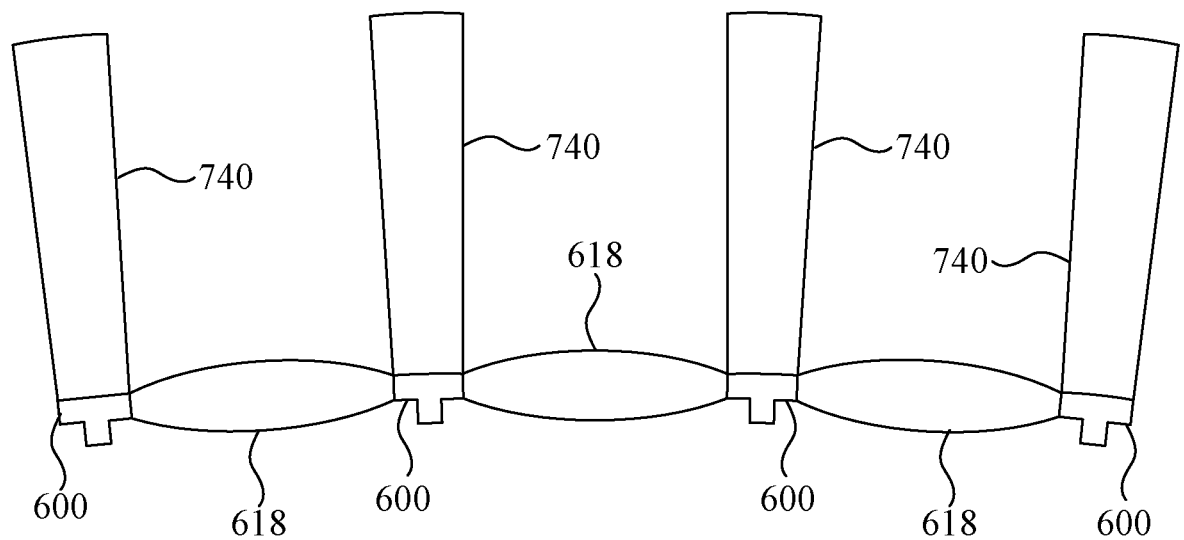
FIG. 29 is a cutaway cross-sectional view of the frame that supports the array of microlenses in FIG. 23 attached to the wall of FIG. 28.

FIG. 29 shows that the frame 600, which supports the array of microlenses 618 of FIG. 23, has been attached to the wall 740 of FIG. 28. The curvature of the microlens array is fixed by the solid metal wall 740, which has tapered wall sections in this cross-sectional view. The frame 600 may be attached to the wall in a variety of ways. For example, an adhesive such as epoxy can be applied to the top of the wall 740 by ink jet or 3D printing or by pressing the top to a cylindrical surface that has been coated with epoxy, after which the top of the wall and the curved frame 600 can be joined. The wall and the frame can be guided together by a voltage difference between the two. Alternatively, the wall 740 and the frame 600 can both be made of magnetic material, and the wall and frame can be guided together and held by magnetic force in combination with an adhesive.

Figure 30:
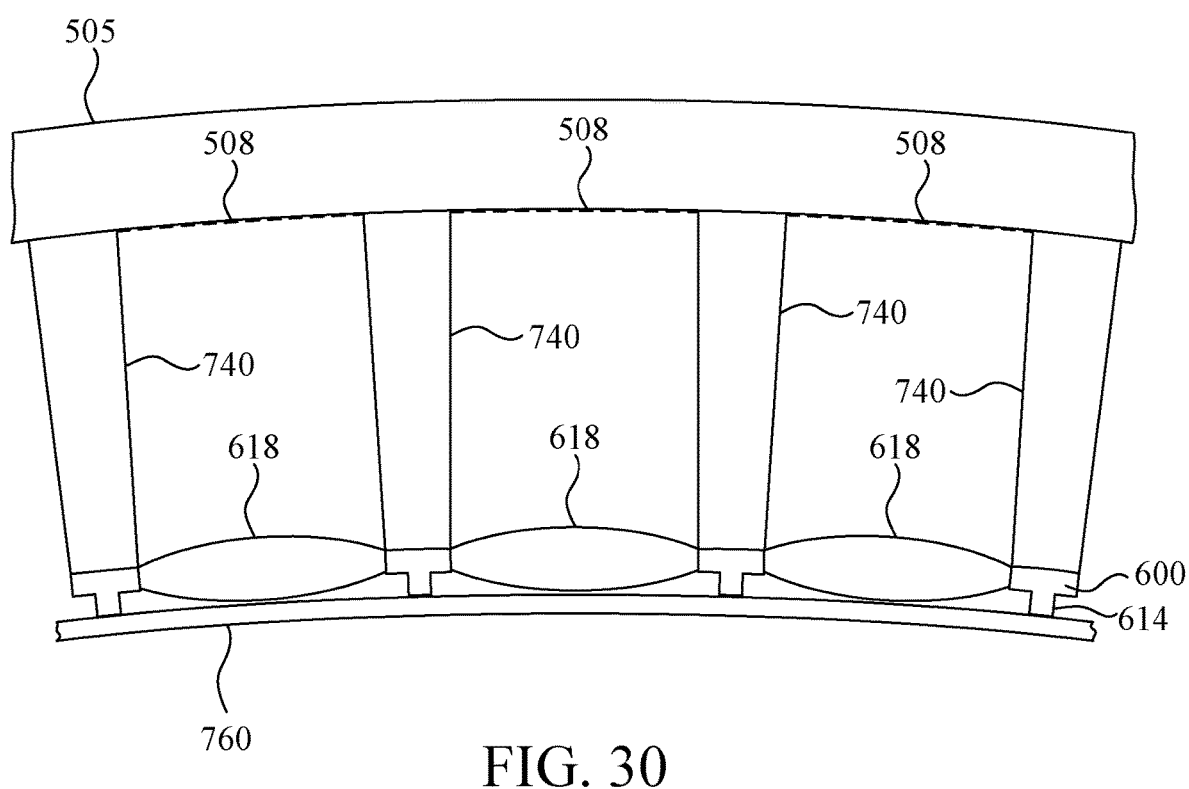
FIG. 30 is a cutaway cross-sectional view showing that a transparent protective layer has been attached to the wall, frame and microlenses of FIG. 29 to form a curved display surface, with the other end of the wall attached to a curved display screen to form the curved display system of FIG. 19.

FIG. 30 shows that a transparent protective layer 760 has been attached to the projecting parts 614 of frame 600 to form a curved display surface, with each of the microlenses disposed approximately equidistant from the surface. Transparent protective layer 760 may be formed of silicon dioxide or glass, for instance, that is thin enough to allow it to bend slightly without breaking, or a hard transparent polymer, or a laminate of such curved material layers. In one example, an adhesive such as epoxy can be applied to the top of the frame parts 614 by ink jet or 3D printing or by pressing the top to a cylindrical surface that has been coated with epoxy, after which the top of the frame and the curved protective layer 760 can be joined. At the other end of the wall 740 that separates cylindrical cavities 735, the curved display screen 505 is attached. The display screen 505 may be an OLED display or other curved display, and may be attached to the wall 740 with an epoxy or other adhesive, which can be applied to the bottom of the wall 740 by ink jet or 3D printing or by pressing the top to a cylindrical surface that has been coated with epoxy, after which the bottom of the wall and the display screen 505 can be joined. As mentioned above, the display screen 505 has an array of display spots 508 that transmit light through the cylindrical cavities and then through the microlenses. The display spots 508 are divided into groups, with each of the groups corresponding to a different one of the microlenses and the wall 740 separating the light from each group of display spots from the light of the other groups of display spots.

In one embodiment, an augmented reality display may include at least one transparent but partially reflective viewing glass, such as glasses or goggles, for example made of a glass or polymer and attached to a person's head like the system 500 shown in FIGS. 19 and 20. In this case, a display system including a display screen and microlens array may transmit light that reflects from the viewing glass to provide a 3D image to the person's eyes, while the person can see through the viewing glass to view the real world. In one embodiment, such a reflective viewing glass can be curved in the lateral direction like the system 500 shown in FIGS. 19 and 20. The display screen and microlens array in this embodiment are disposed closer to the person's head than the viewing glass.

Although the above description of laterally curved arrays of microlenses and image screens has focused for conciseness on a display system embodiment, in a recording system embodiment the relative positions of the laterally curved image screens and microlens arrays can be essentially reversed, so that the image screen is a recording screen, much as described above for embodiments involving flat arrays of microlenses and image screens. In that case, an imaging system that includes a recording system with a laterally curved microlens array and recording screen and a display system with a similarly curved display screen and microlens array has advantages in mapping which are similar to those described above for the flat-screen imaging systems.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims and equivalents.

The invention claimed is:

1. An imaging device for wearing on a person's head, the imaging device comprising:
a curved array of microlenses disposed adjacent to a curved image screen such that each of the microlenses is approximately the same distance from the image screen, the image screen including an array of spots disposed adjacent to the array of microlenses, with an opaque wall disposed between the array of microlenses and the array of spots, the wall holding the array of microlenses in a curve that approximately matches a curve of the image screen, such that the light passing through one of the microlenses corresponds to a subset of the spots disposed adjacent to that microlens, for directing the light to an eye of the person that is located between the microlens and an approximate center of the curve.

2. The imaging device of claim 1, wherein the subset of spots is disposed approximately at a focal plane of the microlens that corresponds to the subset of spots.

3. The imaging device of claim 1, wherein the subset of spots transmits light through the microlens that corresponds to the subset of spots.

4. The imaging device of claim 1, wherein the image screen and the array of microlenses are curved over an angle of at least one radian.

5. The imaging device of claim 1, wherein the image screen and the array of microlenses have a radius of curvature that is in a range between 10 centimeters and 40 centimeters.

6. The imaging device of claim 1, further comprising a head mounting apparatus that is attached to the array of microlenses.

7. The imaging device of claim 1, wherein the image screen is a display screen.

8. The imaging device of claim 1, wherein a cross section of the wall is tapered.

9. An imaging device for wearing on a person's head, the imaging device comprising:
an array of microlenses disposed adjacent to a curved surface such that each of the microlenses is approximately the same distance from the surface;
an image screen including an array of spots disposed adjacent to the surface, such that each of the spots is approximately equidistant from the surface and a subset of the spots is disposed adjacent to each of the microlenses; and
an opaque wall disposed between the array of microlenses and the array of spots such that the light passing through one of the microlenses corresponds to the subset of spots disposed adjacent to that microlens, the wall holding the array of microlenses in a curve approximately matching that of the curved surface, for directing the light to an eye of the person that is located between the microlens and an approximate center of the curve;
wherein the surface is curved over an angle of at least one radian.

10. The imaging device of claim 9, wherein the subset of spots is disposed approximately at a focal plane of the microlens.

11. The imaging device of claim 9, wherein the surface is concave over an angle less than about 1.5 radians.

12. The imaging device of claim 9, wherein the surface has a radius of curvature that is in a range between 10 centimeters and 40 centimeters.

13. The imaging device of claim 9, wherein the image screen is a display screen.

14. The imaging device of claim 9, further comprising a head mounting apparatus that is attached to the array of microlenses.

15. An imaging device for wearing on a person's head, the imaging device comprising:
an array of microlenses disposed adjacent to a curved surface such that each of the microlenses is approximately the same distance from the surface;
an image screen including an array of spots disposed adjacent to the surface, such that each of the spots is approximately equidistant from the surface and a subset of the spots is disposed adjacent to each of the microlenses; and
an opaque wall disposed between the array of microlenses and the image screen such that the light passing through one of the microlenses corresponds to the subset of spots disposed adjacent to that microlens, the wall holding the array of microlenses to a curvature approximately matching that of the curved surface;
wherein the curved surface has a radius of curvature that is in a range between 10 centimeters and 40 centimeters, for directing the light to an eye of the person that is located between the microlens and an approximate center of the curvature.

16. The imaging device of claim 15, wherein the subset of spots is disposed approximately at a focal plane of the microlens.

17. The imaging device of claim 15, further comprising a head mounting apparatus that is attached to the array of microlenses.

18. The imaging device of claim 15, wherein the image screen is a display screen.

* * * * *